United States Patent
Mistry et al.

(10) Patent No.: US 11,953,800 B2
(45) Date of Patent: Apr. 9, 2024

(54) COUPLING MODULATED RING RESONATOR MODULATOR

(71) Applicant: Nokia Solutions and Networks Oy, Espoo (FI)

(72) Inventors: Ajay Mistry, Brooklyn, NY (US); Meisam Bahadori, New York, NY (US); Alexander Rylyakov, Staten Island, NY (US); Rafid Sukkar, Niles, IL (US); Matthew Streshinsky, Taos, NM (US)

(73) Assignee: Nokia Solutions and Networks Oy, Espoo (FI)

( * ) Notice: Subject to any disclaimer, the term of this patent is extended or adjusted under 35 U.S.C. 154(b) by 49 days.

(21) Appl. No.: 17/667,578

(22) Filed: Feb. 9, 2022

(65) Prior Publication Data
US 2023/0251546 A1    Aug. 10, 2023

(51) Int. Cl.
*G02F 1/21* (2006.01)
*G02F 1/225* (2006.01)

(52) U.S. Cl.
CPC ............ *G02F 1/212* (2021.01); *G02F 1/2255* (2013.01)

(58) Field of Classification Search
CPC ........ G02F 1/212; G02F 1/225; G02F 1/2255; G02F 2201/12; G02F 2203/50; G02B 27/283; G02B 6/125
See application file for complete search history.

(56) References Cited

U.S. PATENT DOCUMENTS

| | | |
|---|---|---|
| 6,115,520 A | 9/2000 | Laskowski et al. |
| 6,563,971 B1 | 5/2003 | Burton et al. |
| 6,731,841 B1 | 5/2004 | Shirk et al. |
| 7,035,495 B2 | 4/2006 | Takahashi et al. |
| 7,259,901 B2 | 8/2007 | Parsons et al. |
| 7,333,691 B1 | 2/2008 | Gill et al. |
| 7,480,423 B2 | 1/2009 | Seguin et al. |
| 7,532,789 B1 | 5/2009 | Doylend |
| 9,235,101 B2 | 1/2016 | Silverstone et al. |
| 9,291,837 B1 | 3/2016 | Yap |
| 9,470,951 B2 | 10/2016 | Liboiron-Ladouceur et al. |

(Continued)

FOREIGN PATENT DOCUMENTS

WO    2009048572 A1    4/2009

OTHER PUBLICATIONS

Sacher WD, Green WM, Assefa S, Barwicz T, Pan H, Shank SM, Vlasov YA, Poon JK. Coupling modulation of microrings at rates beyond the linewidth limit. Opt Express. Apr. 22, 2013;21(8):9722-33. doi: 10.1364/OE.21.009722.

(Continued)

*Primary Examiner* — Michael P Mooney
(74) *Attorney, Agent, or Firm* — Stratford Group Ltd.

(57) ABSTRACT

An optical resonant modulator based on coupling modulation, comprising a resonant structure with an embedded Mach-Zehnder interferometer that is differentially driven to induced amplitude modulation at the output port. The principle of coupling modulation enables high data/baud rates to be achieved in a photonic integrated circuit, e.g. silicon, footprint that is considerably smaller than that of a conventional traveling-wave Mach-Zehnder modulator, in particular by utilizing space saving features, such as ring resonator phase shifters and bend waveguide arms.

20 Claims, 17 Drawing Sheets

(56) References Cited

U.S. PATENT DOCUMENTS

| | | | |
|---|---|---|---|
| 9,519,162 | B2 | 12/2016 | Ding et al. |
| 9,559,779 | B2 | 1/2017 | Ding et al. |
| 9,720,300 | B2 | 8/2017 | Gill et al. |
| 9,746,743 | B1 | 8/2017 | Rabiei |
| 9,791,761 | B1 | 10/2017 | Li et al. |
| 9,912,413 | B1 | 3/2018 | Dupuis et al. |
| 10,168,596 | B2 | 1/2019 | Williams et al. |
| 10,225,018 | B2 | 3/2019 | Witzens et al. |
| 10,254,623 | B2 | 4/2019 | Danelon et al. |
| 10,527,871 | B2 | 1/2020 | Saeedi et al. |
| 10,831,081 | B2 | 11/2020 | Vera Villarroel et al. |
| 11,327,384 | B2 | 5/2022 | Mistry et al. |
| 2005/0117842 | A1 | 6/2005 | Takahashi et al. |
| 2006/0056845 | A1 | 3/2006 | Parsons et al. |
| 2006/0083456 | A1 | 4/2006 | Burns et al. |
| 2009/0092350 | A1 | 4/2009 | Gill |
| 2013/0121631 | A1 | 5/2013 | Yu et al. |
| 2015/0029569 | A1 | 1/2015 | Smith et al. |
| 2015/0261058 | A1 | 9/2015 | Silverstone et al. |
| 2016/0103382 | A1 | 4/2016 | Liboiron-Ladouceur et al. |
| 2016/0306201 | A1 | 10/2016 | Saeedi et al. |
| 2018/0054257 | A1 | 2/2018 | Witzens et al. |
| 2018/0246389 | A1* | 8/2018 | Danelon .................. G02F 1/225 |
| 2018/0267340 | A1 | 9/2018 | Rohde et al. |
| 2018/0329269 | A1* | 11/2018 | Ward .................... G02F 1/2255 |
| 2019/0049666 | A1 | 2/2019 | Welch |
| 2021/0096440 | A1 | 4/2021 | Kawakami et al. |

OTHER PUBLICATIONS

Sacher WD, Green WM, Gill DM, Assefa S, Barwicz T, PKhater M, Kiewra E, Reinholm C, Shank SM, Vlasov YA, Poon JK. Binary phase-shift keying by coupling modulation of microrings. Opt Express. Aug. 25, 2014;22(17):20252-9. doi: 10.1364/OE.22. 020252. PMID: 25321234.

Karimelahi et al.; Quadrature amplitude modulation (QAM) using binary-driven coupling-modulated rings, Optics Communications 366 (2016) 354-361 (Year: 2016).

Saeedi et al., Differential Optical Ring Modulator: Breaking the Bandwidth/Quality-factor Trade-off, Ecoc 2015—ID: 0766 (Year: 2015).

Tu et al., State of the Art and Perspectives on Silicon Photonic Switches, Micromachines 2019, 10, 51; doi: 10.3390/mi10010051 (Year: 2019).

Zhang et al., Ultralinear heterogeneously integrated ring-assisted Mach-Zehnder interferometer modulation on silicon, Optical, V. 3, N. 12, 2016 (Year: 2016).

Li et al., Design of a single all-silicon ring resonator with a 150 nm free spectral range and a 100 nm tuning range around 1550 nm, Photon. Res. vol. 4, No. 2, Apr. 2016 (Year: 2016).

Li et al., A simple and novel method to obtain an FSR free silicon ring Resonator, Silicon Photonics and Photonic Integrated Circuits V, Proc. of SPIE vol. 9891, 989115, 2016 (Year: 2016).

Li et al., An actively controlled silicon ring resonator with a fully tunable Fano resonance, APL Photonics 2, 096101 (2017); https://doi.org/10.1063/1.5000514. (Year: 2017).

Li et al., Fundamental supression of backscaterring in silicon microrings, vol. 25, No. 3. Feb. 6, 2017, Optics Express 2092 (Year: 2017).

Extended Search Report for corresponding EP Patent Application No. 23153933 dated Jun. 12, 2023.

* cited by examiner

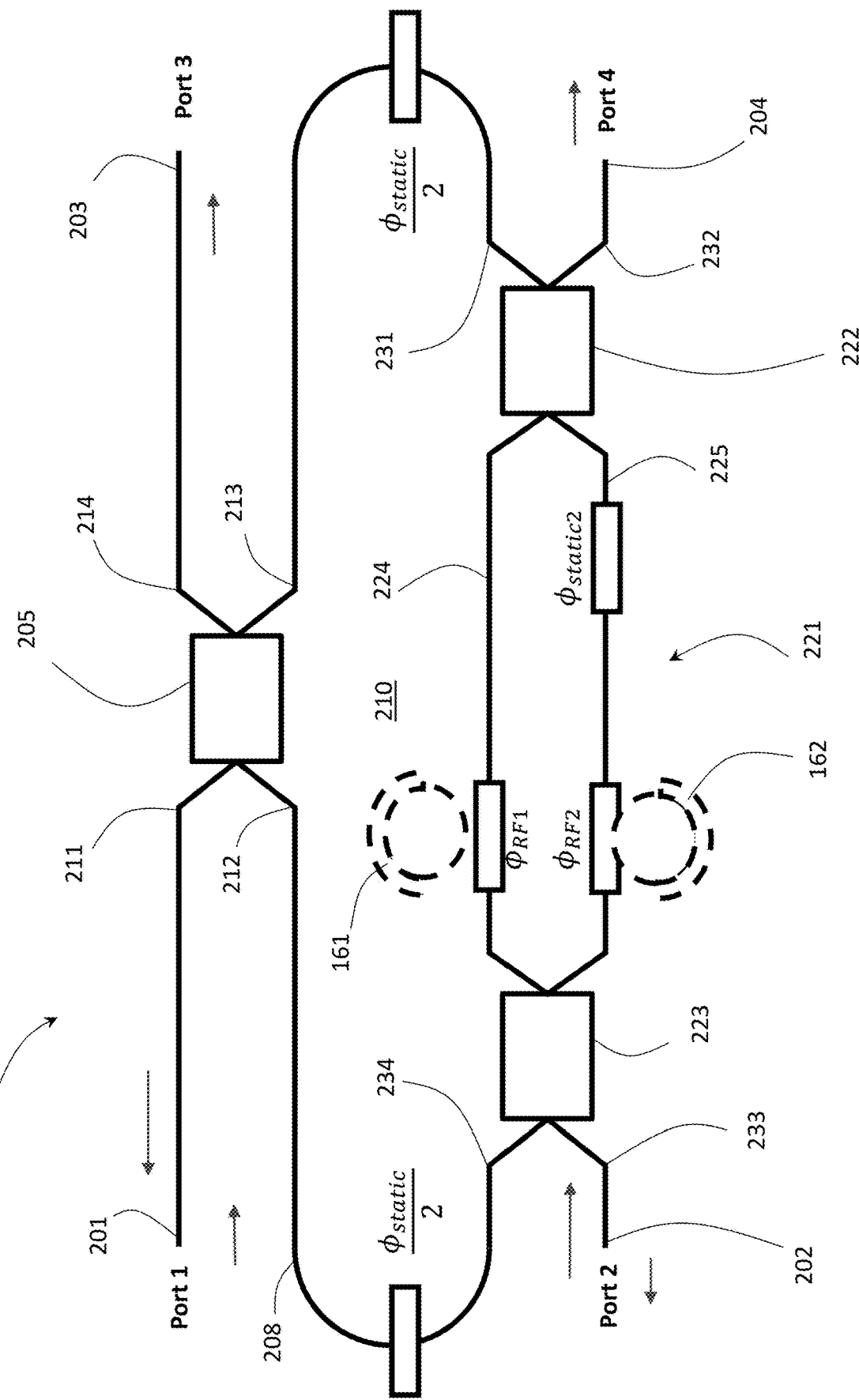

COUPLING MODULATED RING RESONATOR MODULATOR

TECHNICAL FIELD

The present invention relates to optical data modulators.

BACKGROUND

The Mach-Zehnder interferometer (MZI)-based modulator (MZM) is one of the most prominent modulator types used in commercial optical communication systems. The device can operate as an intensity modulator or as a phase modulator based on the phase shift, $\phi_{static}$, applied to one or both of the MZM arms.

By operating the MZM in its linear regime (optical field vs. applied electrical signal), both multi-level pulse amplitude modulation (PAM) and phase shift keying (PSK) can be achieved. While the simplest modulation format for intensity modulation is on-off keying (OOK), or PAM2, higher order modulation formats such as PAM4, PAM8, etc., can be achieved. Likewise, for phase modulation, while the simplest modulation format is binary PSK (BPSK), or 2-PSK, higher order formats such as 4-PSK, 8-PSK, etc., can be achieved.

By taking advantage of orthogonal communication dimensions, MZMs can be configured to encode information via amplitude and phase modulation simultaneously, to achieve coherent modulation formats such as quadrature phase shift keying (QPSK), dual-polarization QPSK (DP-QPSK) PAM4 or PAM8, etc.

A drawback of integrating MZMs into silicon photonic-based integrated circuits (PICs) is their large footprints. Typically, to achieve low half-wave voltages ($V_\pi$), MZMs require several-millimeter long phase shifter segments due to the small refractive index change that results when high speed, but low efficiency, carrier-depletion mode, optical phase shifters are used. As a consequence, travelling-wave, radio frequency (RF) electrodes are typically also required to achieve high electro-optic bandwidths (EOBWs). While travelling-wave driven MZMs (TWMZs) with large bandwidths have been demonstrated, these devices typically have higher energy consumption, greater design complexity, and occupy a larger on-chip footprint as compared to other optical modulator types, such as the ring resonator (RR) modulator.

RR optical modulators are particularly attractive for PAM applications, due to their ability to achieve large EOBWs while occupying compact/small on-chip footprints. In RR optical modulators based on intracavity optical modulation, the intracavity parameters, such as the cavity loss or round-trip optical phase, may be modulated, and hence, the intracavity optical field amplitude at the output of the modulator rises and falls at a time-scale set by the photon cavity lifetime and/or the RC bandwidth of the phase shifter. As a result, in RR intracavity modulation-based resonators, the EOBW of the modulator is inherently limited by the cavity photon lifetime. Moreover, the phase response of the intracavity modulator RR is inherently nonlinear, limiting its application in coherent modulation formats.

SUMMARY OF THE INVENTION

A first apparatus comprising:
a Mach-Zehnder optical modulator including a first optical coupler, a second optical coupler, a first optical waveguide, and a second optical waveguide, each of the first optical waveguide and the second optical waveguide connecting a corresponding optical output of the first optical coupler to a corresponding optical input of the second optical coupler;
an optical feedback waveguide connecting an optical output of the second optical coupler to an optical input of the first optical coupler;
a first optical phase shifter along one of the first optical waveguide and the second optical waveguide, the first optical phase shifter comprising a first plurality of electrode segments; wherein a physical length of the optical feedback waveguide is shorter than a physical length of each of the first optical waveguide and the second optical waveguide;
wherein the first optical waveguide comprises a first bent optical waveguide arm and the second optical waveguide comprises a second bent optical waveguide arm; and
wherein the first bent optical waveguide arm includes a first straight optical waveguide section and a second straight optical waveguide section, the first straight optical waveguide section and the second straight optical waveguide sections being substantially parallel and optically connected by a bent optical waveguide section.

In any of the above embodiments, the first apparatus may further comprise an electronic driver including a plurality of electronic driver stages, each of the plurality of electronic driver stages configured to operate a corresponding one of the first plurality of electrode segments in parallel.

In any of the above embodiments, the first apparatus may further comprises a plurality of RF waveguides electrically connecting the electronic driver to the first plurality of electrode segments, the plurality of RF waveguides having a plurality of electrical connections configured to drive the first plurality of electrode segments.

In any of the above embodiments, the first apparatus may also include that the first bent optical waveguide arm includes an about 1800 bend between the first waveguide section and the second waveguide section.

In any of the above embodiments, the first apparatus may also include a first phase shifter portion along the first waveguide section, and a second phase shifter portion along the second waveguide section.

In any of the above embodiments, the first apparatus may also include a first optical ring resonator optically connected to the first optical waveguide; and a second optical ring resonator optically connected to the second optical waveguide.

In any of the above embodiments, the first apparatus may also include a first optical phase shifter adjacent the first optical waveguide; a second optical phase shifter adjacent the second optical waveguide; and wherein the electronic driver is configured to drive the first optical phase shifter and the second optical phase shifter in a push-pull configuration.

In any of the above embodiments, the first apparatus may include that the electronic driver is configured to drive the first optical phase shifter and the second optical phase shifter to provide less than a $\pi/2$ phase shift between the first optical waveguide and the second optical waveguide.

In any of the above embodiments, the first apparatus may also include that optical cores of the first optical waveguide, the second optical waveguide, and the optical feedback waveguide are comprised of a same material.

In any of the above embodiments, the first apparatus may also include a third optical coupler, a first segment of the optical feedback waveguide being connected to a second segment of the optical feedback waveguide by the third optical coupler.

In any of the above embodiments, the first apparatus may also include that the third optical coupler comprises a Mach-Zehnder interferometer.

In any of the above embodiments, the first apparatus may also include a second optical modulator in parallel with the first optical modulator; a first combiner for combining a first modulated output signal from the first optical modulator and a second modulated output signal from the second optical modulator; and a first additional phase shift between the second optical modulator and the first combiner to provide a first phase shift between the first modulated output signal and the second modulated output signal, thereby forming a nested in-phase and quadrature optical modulator.

In any of the above embodiments, the first apparatus may also include a third optical modulator and a fourth optical modulator in parallel with the first optical modulator and the second optical modulator for outputting a third modulated output signal and a fourth modulated output signal, respectively; a second combiner for combining the third modulated output signal and the fourth modulated output signal; a second additional phase shift between the fourth optical modulator and the second combiner to provide a second phase shift between the third modulated output signal and the fourth modulated output signal; a polarization rotator for rotating the polarization of the third modulated output signal and the fourth modulated output signal; and a polarization combiner for combining the first modulated output signal, the second modulated output signal, the third modulated output signal, and the fourth modulated output signal, thereby forming a nested dual polarization, in-phase and quadrature optical modulator.

A second apparatus comprises: a first Mach-Zehnder optical modulator including first optical coupler, a second optical coupler, first optical waveguide, and a second optical waveguide, each of the first optical waveguide and the second optical waveguide connecting a corresponding optical output of the first optical coupler to a corresponding optical input of the second optical coupler; a first tunable optical ring resonator optically connected to and adjacent to the first optical waveguide; and an optical feedback waveguide connecting an optical output of the second optical coupler to an optical input of the first optical coupler; a third optical coupler having more than two optical ports, a first segment of the optical feedback waveguide being optically connected to a second segment of the optical feedback waveguide by the third optical coupler; a first optical phase shifter along one of the first optical waveguide and the second optical waveguide, the first optical phase shifter comprising a first plurality of electrode segments; wherein a physical length of the optical feedback waveguide is shorter than a physical length of each of the first optical waveguide and the second optical waveguide; and an electronic driver including an array of electrical outputs for outputting electrical radio frequency (RF) drive signals, configured to transmit the electrical RF drive signals from a corresponding one of the array of electrical outputs to the plurality of modulating RF electrode segments.

In any of the above embodiments, the second apparatus may further comprise an electronic driver including a plurality of electronic driver stages, each of the plurality of electronic driver stages configured to operate a corresponding one of the first plurality of electrode segments in parallel.

In any of the above embodiments, the second apparatus may further comprise a plurality of RF waveguides electrically connecting the electronic driver to the first plurality of electrode segments, the plurality of RF waveguides having a plurality of electrical connections configured to drive the first plurality of electrode segments.

In some embodiments, the second apparatus may also include a second tunable optical ring resonator optically connected to and adjacent to the second optical waveguide.

In any of the above embodiments, the second apparatus may also include a second tunable optical ring resonator optically connected to and adjacent to the second optical waveguide.

In any of the above embodiments, the second apparatus may also include that the at least on optical phase shifter comprises a first optical phase shifter adjacent the first optical waveguide; a second phase shifter adjacent the second optical waveguide; and that the electronic driver is configured to operate the first optical phase tuner and the second optical phase shifter in a push-pull configuration.

In any of the above embodiments, the second apparatus may also include that the electronic driver is configured to drive the first optical phase shifter and the second optical phase shifter to provide less than a $\pi/2$ phase shift between the first optical waveguide and the second optical waveguide.

In any of the above embodiments, the second apparatus may also include that the first optical waveguide comprises a first bent optical waveguide arm; and wherein the second optical waveguide comprises a second bent optical waveguide arm.

In any of the above embodiments, the second apparatus may also include that the first bent optical waveguide arm includes a first optical waveguide section, and a second optical waveguide section substantially parallel to the first section.

In any of the above embodiments, the second apparatus may also include that the first bent optical waveguide arm includes an about 180° bend between the first waveguide section and the second waveguide section.

In any of the above embodiments, the second apparatus may also include a third optical coupler, a first segment of the optical feedback waveguide being connected to a second segment of the optical feedback waveguide by the third optical coupler.

In any of the above embodiments, the second apparatus may also include that the third optical coupler comprises a Mach-Zehnder interferometer.

In any of the above embodiments, the second apparatus may also include a second Mach-Zehnder optical modulator including optical ring resonators along parallel optical arms thereof, and wherein the second Mach-Zehnder optical modulator connects one end of the optical feedback waveguide to the optical input of the first optical coupler of the first Mach-Zehnder optical modulator.

In any of the above embodiments, the second apparatus may also include a second optical modulator in parallel with the first optical modulator; a first combiner for combining a first modulated output signal from the first optical modulator and a second modulated output signal from the second optical modulator; and a first additional optical phase shifter between the second optical modulator and the first combiner to provide a first additional phase shift between the first modulated output signal and the second modulated output signal, thereby forming a nested in-phase and quadrature optical modulator.

In any of the above embodiments, the second apparatus may also include a third optical modulator and a fourth optical modulator in parallel with the first optical modulator and the second optical modulator for outputting a third modulated output signal and a fourth modulated output signal, respectively; a second combiner for combining the third modulated output signal and the fourth modulated output signal; a second additional phase shift between the fourth optical modulator and the second combiner to provide a second additional phase shift between the third modulated output signal and the fourth modulated output signal; a polarization rotator for rotating the polarization of the third modulated output signal and the fourth modulated output signal; and a polarization combiner for combining the first modulated output signal, the second modulated output signal, the third modulated output signal, and the fourth modulated output signal, thereby forming a nested dual polarization, in-phase and quadrature optical modulator.

BRIEF DESCRIPTION OF THE DRAWINGS

The invention will be described in greater detail with reference to the accompanying drawings which represent preferred embodiments thereof, wherein:

FIG. 5A is a schematic diagram of a coupling modulated (add-drop) ring resonator optical modulator apparatus in accordance with an embodiment of the present invention;

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

In conventional ring resonator-based modulators, the electro-optic bandwidth of the modulator may be limited by the photon lifetime of the cavity, i.e. the optical linewidth. In a coupling modulated ring resonator (CRR), the photon lifetime limitation can be overcome and as a result, the EOBW of the modulator is simply limited by the EOBW of the embedded coupling modulation element.

Figure 1:
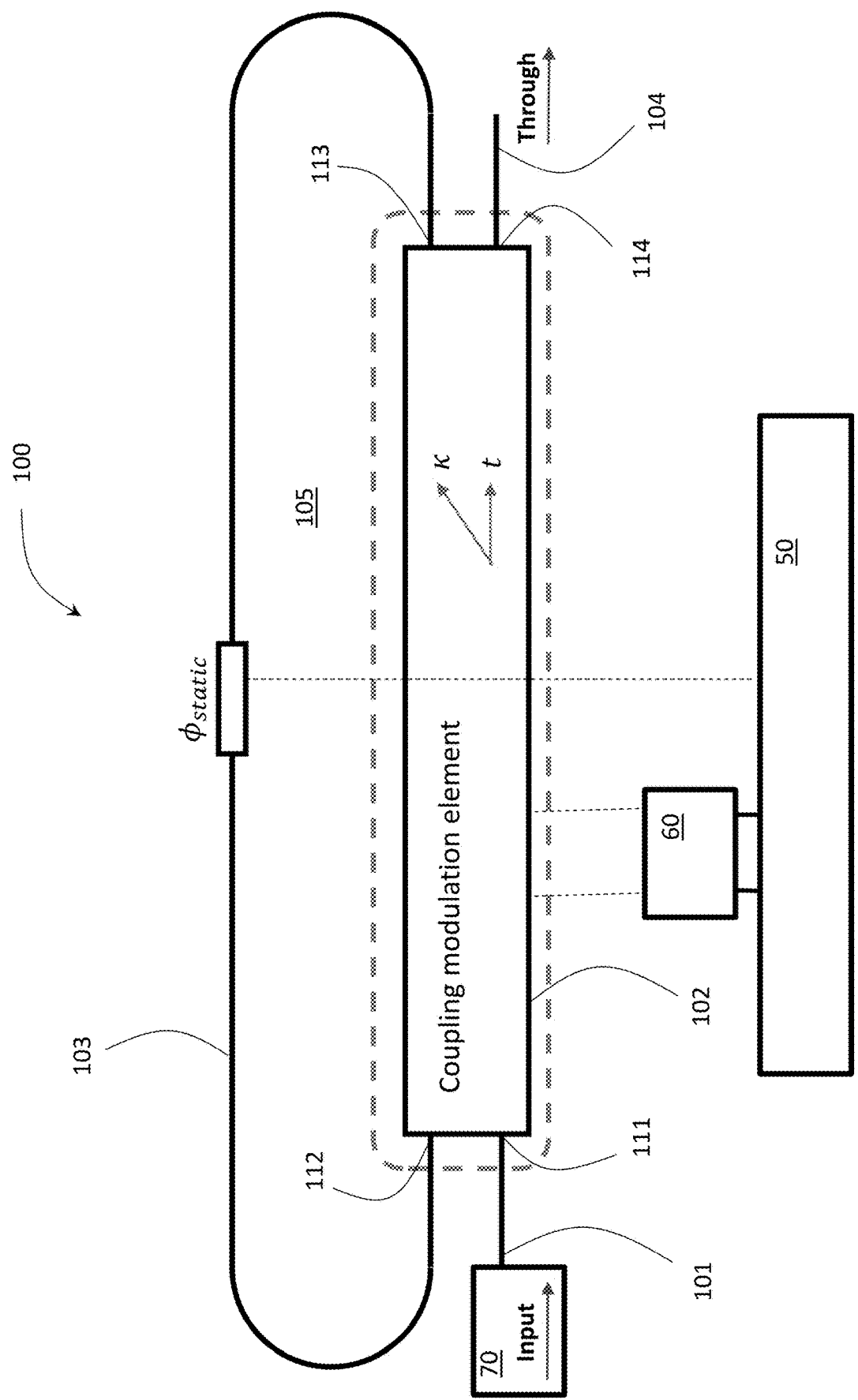
FIG. 1 is schematic diagram of a coupling-modulated, resonator optical modulator apparatus in accordance with an embodiment of the present invention.

With reference to FIG. 1, a coupling-modulated RR optical modulator apparatus 100, e.g. a planar integrated optical device, includes an input optical port 101, a coupling optical modulation element 102, an feedback optical waveguide 103, and an output optical port 104. The coupling optical modulation element 102 includes a first optical port 111 optically connected to the input optical port 101, a second optical port 112 optically connected to one end of the feedback optical waveguide 103, a third optical port 113 optically connected to another end of the feedback optical waveguide 103, and a fourth optical port 114 optically connected to the output optical port 104. A quasi-static phase shifter $\phi_{static}$, e.g. a low speed tunable phase shifter, may be provided adjacent to a segment of the feedback optical waveguide 103 to enable a controller 50 to adjust the phase of the light in an optical loop 105 closed thereby, i.e. adjust the optical path length of the optical loop 105 and thereby adjust a resonant condition, e.g. resonant wavelength, of the optical loop 105, which may typically be set to match a wavelength of the input beam of light. The optical loop 105 may comprise the feedback optical waveguide 103 and the optical coupling modulation element 102. The quasi-static phase shifter $\phi_{static}$ may also be adjusted by the controller 50 to maintain the resonant wavelength of the optical loop about constant, e.g. in the presence of external environment changes, such as temperature changes etc., which might cause wavelength drift. A higher-speed, e.g. data-speed, tunable phase shifter to tune i.e. to modulate, the resonance condition of the optical loop 105, i.e. in and out of resonance, as in conventional intra-cavity RR modulators, is typically not required since the light coupling in and/or out is being modulated.

Accordingly, rather than modulating the optical path length of the optical loop 105 to data-modulate light of a received optical wavelength carrier, the optical coupling of the optical loop 105 from the input optical port 101 and to the output optical port 104 may be modulated, e.g. at data symbol rates, by electrically adjusting the optical coupling modulation element 102 using an electronic driver 60. A beam of light, e.g. continuous wave, from a light source, e.g. a laser 70, is launched at the input optical port 101 and enters the coupling-modulated RR optical modulator apparatus 100 via the optical coupling modulation element 102. A first portion (sub-beam) of the light will enter the feedback optical waveguide 103 and may resonate in the optical loop 105 closed thereby, while a second portion (sub-beam) of light will be coupled to the output or "through" optical port 104. The first portion will recombine in the optical coupling modulation element 102 with the second portion after each round-trip inside the feedback optical waveguide 103, e.g. via optical interference. The optical coupling modulation element 102 effectively gates the amount of light that enters and exits the feedback optical waveguide 103. By applying a phase shift in the optical coupling modulation element 102, the coupling ratio of the optical coupling modulation element 102, i.e. the amount of and/or the phase of the circulating light that enters and/or exits the optical loop 105, and therefore the amount of and/or the phase of the light that exits the output optical port 104 will change, thereby performing optical signal modulation, i.e. to produce a data modulated optical signal at the output optical port 104. The phase shift, e.g. less than $\pi$ radians, preferably less than $\pi/2$ radians, and more preferably between $0.1\pi$ to $0.4\pi$ radians, required by the optical coupling modulation element 102 to achieve "0%" to "100%" transmission swings, is typically much smaller than that which are required for a linear MZM (which typically requires a $\pi$ radians phase shift). Therefore, some versions of the coupling modulated RR optical modulator apparatus 100 may occupy much less area on a chip and may require less power for data modulation due to shorter phase shifter length(s).

In the coupling-modulated RR optical modulator apparatus 100 based on coupling modulation, the intracavity parameters may stay about constant while the optical coupling coefficients (t and $\kappa$) of the coupling-modulated RR optical modulator apparatus 100 are modulated, thereby changing the extinction ratio of the coupling-modulated RR optical modulator apparatus 100 and, hence, power at the output optical port 104. The optical coupling modulation element 102 effectively gates the intracavity optical field as it exits the optical loop 105, and, hence, the EOBW of the RR optical modulator apparatus 100, in some cases, is not limited by the photon lifetime of the cavity, or optical loop 105, i.e. optical linewidth, if the optical coupling modulation element 102 does not change the resonant condition of the cavity, i.e. the optical loop 105. Moreover, coupling modulated RR optical modulators 100 may be configured to achieve more linear amplitude and/or phase responses, unlike intracavity modulated optical RR modulators.

Variants of coupling modulated RR optical modulators 100 may be used for both PAM and coherent applications. The optical coupling modulation element 102 may be any optical structure that may change/modulate the amount of light coupled to and from the feedback optical waveguide 103, e.g. at data symbol rates, forming the optical loop 105.

In various embodiments, ring resonators herein may have various lateral shapes or footprints along a major surface of a planar support substrate.

Figure 2:
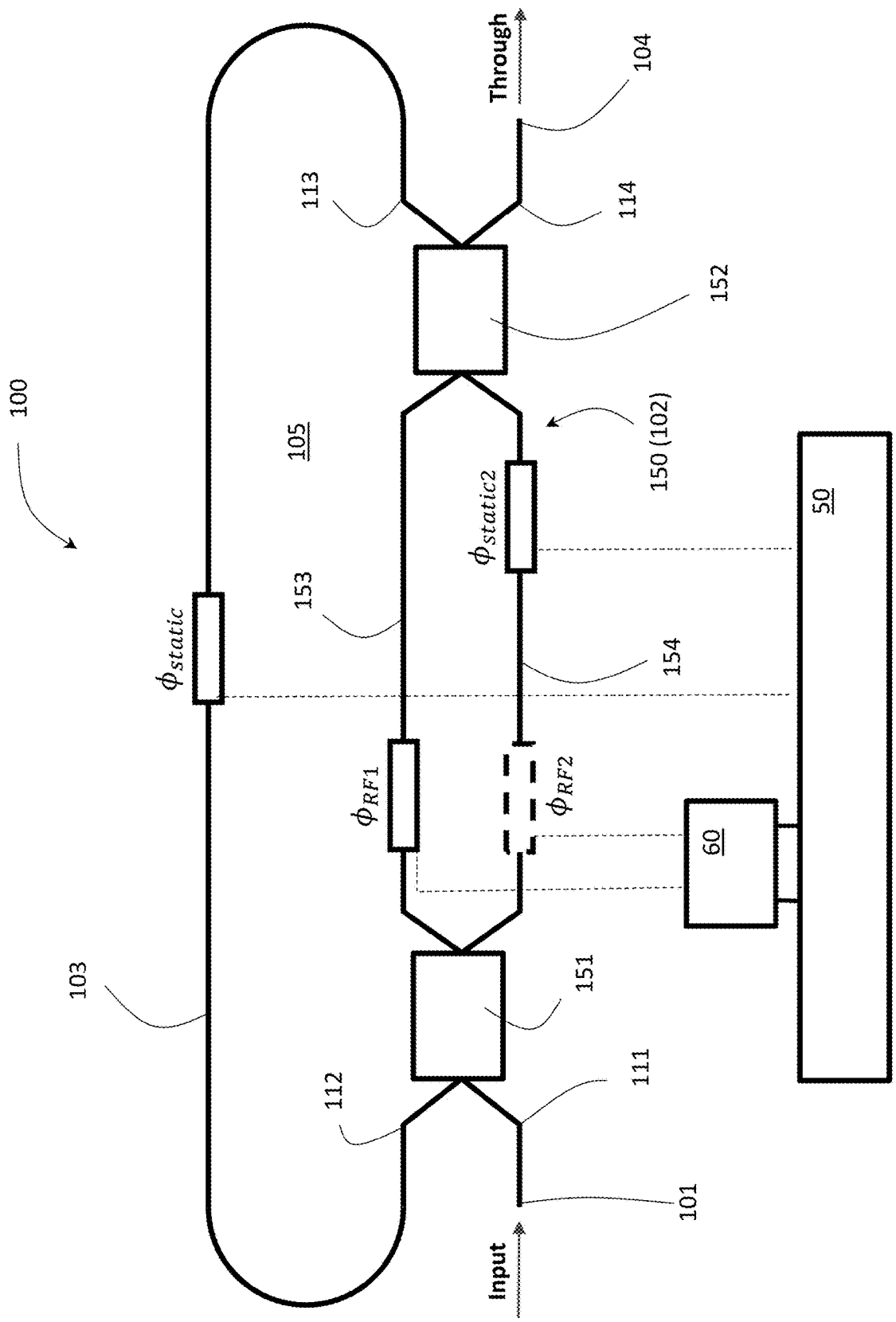
FIG. 2 is a schematic diagram of a coupling-modulated, ring resonator optical modulator apparatus in accordance with an embodiment of the present invention.

With reference to FIGS. 2, the coupling modulated RR optical modulator apparatus 100 may comprise an (Mach-Zehnder Interferometer) MZI optical coupler 150, as the optical coupling modulation element 102. It should be noted that in conventional MZMs, used as standalone optical modulators to achieve a $\pi$ phase difference between the interfered light from the two MZM optical arms to generate a complete "0%" to close to "100%" ON/OFF intensity ratio for output light, typically use millimeter long travelling wave (TW) electrical operating electrodes in the optical phase shifters. However, in the MZI optical coupler 150 used as the optical coupling modulation element 102, may, in some embodiments, use small changes in the optical coupling coefficient(s) to produce a large change in the amplitude and/or phase of the output optical signal coupled out of the feedback optical waveguide 103 at the output port 104. Thus, a "0%" to close to "100%" ON/OFF optical modulation or transmission swings may be achieved, in some embodiments, with much less than a net $\pi$ phase difference between the MZM arms, e.g. less than $\pi$ radians, preferably less than $\pi/2$ radians, and more preferably between $0.1\pi$ to $0.4\pi$ radians, effectively reducing the modulator $V_\pi$. As a result, operating TW electrodes may be shorter, e.g. less than 1 mm, in optical coupling modulation elements 102 with MZI optical couplers 150, and a small on-chip footprints may still be achieved, e.g. in some embodiments, the operating electrodes for the optical phase shifters may even be lumped electrodes or sequences thereof rather than TW electrodes.

The MZI optical coupler 150 may include a first optical coupler 151 and a second optical coupler 152, e.g. 2×2 50/50 optical splitter or directional optical coupler, interconnected by a first optical waveguide arm 153 and a second optical waveguide arm 154 extending therebetween. Input ports of the first optical coupler 151 forming the first optical port 111 and the second optical port 112, while output optical ports of the second optical coupler 152 forming the third optical port 113 and the fourth optical port 114. Output optical ports of the first optical coupler 151 and input ports of the second optical coupler 152 are optically connected to the first and second optical waveguide arms 153 and 154, respectively The first optical waveguide arm 153 may include a segment including a first tunable phase shifter $\phi_{RF1}$ adjacent thereto, and the second optical waveguide arm 154 may include a segment including a second tunable phase shifter $\phi_{RF2}$ adjacent thereto, which may be driven using control electrodes, e.g. TW electrode, by the electronic driver 60 under control of the controller 50 in normal or differential, e.g. in a push-pull fashion, for amplitude and/or phase modulating the MZI optical coupler 150, and therefore producing the modulated output optical signal. Only the first optical waveguide arm 153 may include a first tunable phase shifter $\phi_{RF1}$ or the first optical waveguide arm 153 may include a first tunable phase shifter and the second waveguide arm 154 may include a second tunable phase shifter $\phi_{RF2}$, which may be driven by the electronic driver 60 under control of the controller 50 for controlling the optical coupling ratio, i.e. modulating the optical coupling, of the MZI optical coupler 150, and therefore producing the amplitude and/or phase modulated output optical signal. One or both of the first optical waveguide arm 153 and the second optical waveguide arm 154 may also include a segment including a quasi-static phase shifter $\phi_{static2}$ which may provide a phase shift of about $\pi$. Each of the first and second tunable phase shifters $\phi_{RF1}$ and $\phi_{RF2}$ may include hot electrodes and corresponding ground electrodes.

Light at the input optical port 101 enters the RR optical modulator apparatus 100 via the optical MZI optical coupler 150. Some of the light will enter the feedback optical waveguide 103 and resonate in the cavity of the optical loop 105, while some light will be coupled to the optical output, or through optical port 104 after each round-trip inside the feedback optical waveguide 103. The MZI optical coupler 150 is configured to combine the input beam of light with light already in the feedback optical waveguide 103 to form a combined beam, and to divide the combined beam into a first optical sub-beam for coupling into the feedback optical waveguide 103 and a second optical sub-beam forming the modulated optical beam of light for output the output optical port 104. The MZI optical coupler 150 effectively gates the amount of resonating light that enters and exits the feedback optical waveguide 103. By applying a phase shift to one or both of the first tunable phase shifter ϕRF1 and the second tunable phase shifter $\phi_{RF2}$, e.g. in a push-pull fashion, to the first optical waveguide arm 153 and/or the second optical waveguide arm 154, the coupling ratio of the MZI optical coupler 150 alternates between a low value and a high value, and the amount of and/or the phase of the circulating optical power, i.e. light, that exits the feedback optical waveguide 103 at the output optical port 104 will change between a minimum and a maximum, thereby performing optical signal modulation.

Unfortunately, the MZI optical coupler 150 may still require substantially long first and second optical waveguide arms 153 and 154, due to the length of the required TW or lumped element electrodes for the first and second tunable phase shifters $\phi_{RF1}$ and $\phi_{RF2}$, which will increase the effective diameter and the optical path length for the feedback optical waveguide 103 and the optical loop 105, and could lead to distortion in the modulated optical output signal, as the modulation rate approaches the free spectral range (FSR) thereof. Accordingly, to solve this issue FIGS. 3A and 3B illustrate examples of space saving optical coupling modulation elements (MZI optical couplers 160 and 170) as the optical coupling modulation element 102.

Figure 3A:
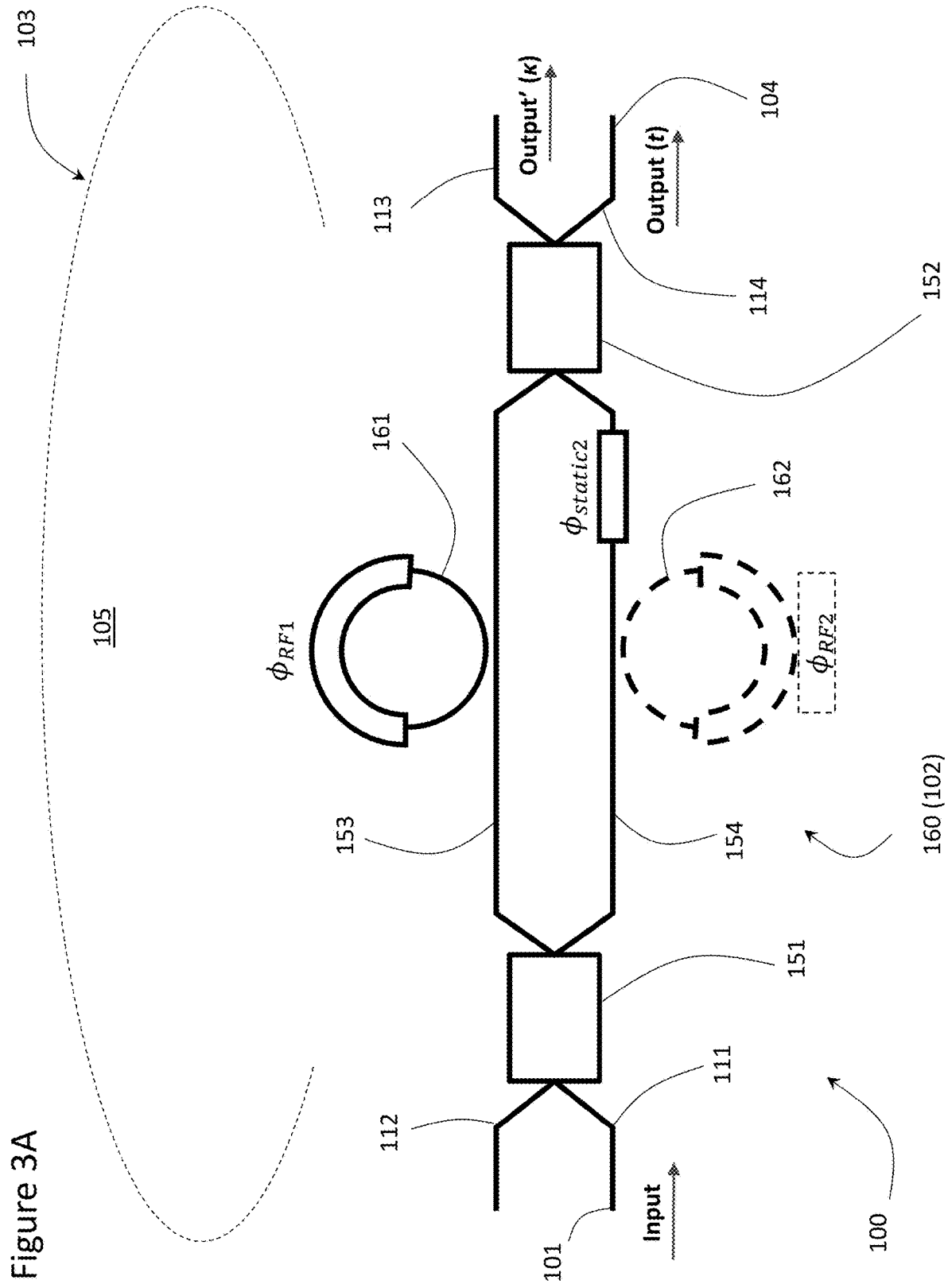
FIG. 3A is a schematic diagram of a coupling-modulated, ring resonator optical modulator apparatus in accordance with an embodiment of the present invention.

FIG. 3A illustrates another embodiment of the RR optical modulator apparatus 100 in which an MZI optical coupler 160, similar to MZI optical coupler 150, also includes a first optical ring resonator 161 adjacent to and optically connected to a segment of the first waveguide arm 153, and an optional second optical ring resonator 162 adjacent to an optically connected to a segment of the second waveguide arm 154. Such a coupling modulation element is termed a ring-assisted MZI (RAMZI). Accordingly, the first tunable phase shifter $\phi_{RF1}$ is configured under control of the controller 50 via the electronic driver 60 to tune the phase of light in the first optical ring resonator 161 to induce a phase shift in the first optical waveguide arm 153, and the second tunable phase shifter $\phi_{RF2}$ is optionally configured under control of the controller 50 via the electronic driver 60 to tune the phase of light in the second optical ring resonator 162 to induce a phase shift in the second optical waveguide arm 154. Inducing these phase shifts changes the amount of and/or the phase of the optical power that exits the optical cavity, i.e. the optical loop 105, formed by the feedback optical waveguide 103 and the MZI optical coupler 160, at the output optical port 104, thereby performing optical signal modulation. The phase shift, e.g. less than π radians, preferably less than π/2 radians, more preferably between 0.02π to 0.4π radians, and even more preferably between 0.02π and 0.05π radians, required by the optical coupling modulation element 102, i.e. the MZI optical coupler 160, to achieve "0%" to "100%" transmission swings, is typically smaller than that which are required for an MZM (which typically requires a π radians phase shift) or even than that of the optical coupling modulation element 102 (MZI optical coupler 150 of FIG. 2). Moreover, the smaller the required phase shift the smaller the required size of the first and/or second phase shifters $\phi_{RF1}$ and $\phi_{RF2}$ and the control electrodes therein, providing a much smaller footprint. Accordingly, the physical and optical length of the feedback optical waveguide 103 may be reduced to less than the physical and optical length of the first and second waveguide arms 153 and 154 of the MZI optical coupler 160, which reduces the effect of the length of the MZI optical coupler 160, i.e. the optical coupling modulation element 102, on the overall physical and optical length of the optical loop 105, whereby higher electro-optic bandwidths (EOBWs) to be generated in a smaller footprint. Typically, the first optical waveguide arm 153, the second optical waveguide arm 154, and the feedback optical waveguide 103 are comprised of the same material, e.g. silicon core with an oxide cladding, such as silicon dioxide surrounding the core. Suitable planar lightwave platforms include silicon on insulator (SOI) photonic integrated circuit, in which a silicon device layer including all of the above-identified waveguide and coupler structures are formed surrounded by silicon dioxide cladding mounted on a suitable substrate. The quasi-static phase shifters $\phi_{static1}$ and $\phi_{static2}$ and the tunable phase shifters $\phi_{RF1}$ and $\phi_{RF2}$ may be formed in or on the device layer adjacent the segments of the corresponding waveguides with the control electrodes mounted thereon.

Figure 3B:
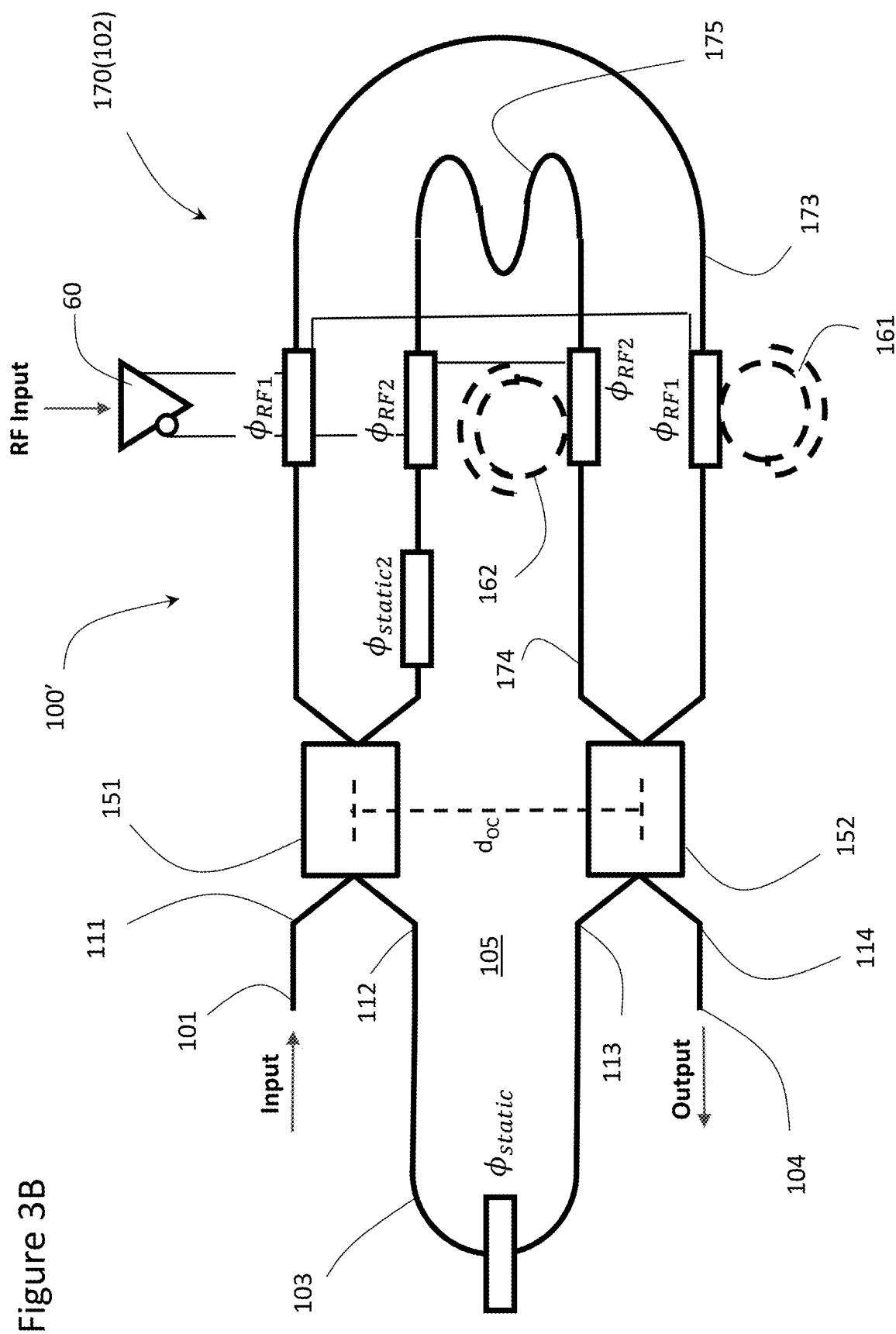
FIG. 3B is a schematic diagram of the coupling-modulated, ring resonator optical modulator apparatus in accordance with the embodiment of FIG. 3A with bent arms.

With reference to FIG. 3B, the RR optical modulator apparatus 100' includes an MZI optical coupler 170, which comprises the same elements as MZI optical couplers 150 and 160, i.e. the first optical coupler 151 and the second optical coupler 152, e.g. 2×2 50/50 optical splitter or directional optical coupler. However, to reduce the effective physical and optical path lengths of the feedback optical waveguide 103, the first optical coupler 151 and the second optical coupler 152 are interconnected by a first bent optical waveguide arm 173 and a second bent optical waveguide arm 174. Input ports of the first optical coupler 151 form the first optical port 111 and the second optical port 112, while output optical ports of the second optical coupler 152 form the third optical port 113 and the fourth optical port 114. Output optical ports of the first coupler 151 and input ports of the second optical coupler 152 are optically connected to the first and second optical waveguide arms 173 and 174, respectively The first bent optical waveguide arm 173 may include the first tunable optical phase shifter $\phi_{RF1}$, and the second bent optical waveguide arm 174 may include the second tunable optical phase shifter $\phi_{RF2}$, which may be normally or differentially driven by the electronic optical modulator driver 60 in a push-pull fashion for modulating the MZI optical coupler 170, and therefore the output light. Each of the first bent optical waveguide arm 173 and the second bent optical waveguide arm 174 may include a first, e.g. straight, waveguide section, a curved waveguide section, and a second, e.g. straight, waveguide section folded back by the curved waveguide section substantially parallel to the first waveguide section. The first bent optical waveguide arm 173 may include a first tunable optical phase shifter $\phi_{RF1}$ portion in each of first and second waveguide sections, and the second bent optical waveguide arm 174 may include a second tunable optical phase shifter $\phi_{RF2}$ portion, in each of the of first and second waveguide sections, which may be differentially driven by the electronic optical modulator driver 60 in a push-pull fashion for optical modulating the MZI optical coupler 170, and therefore the output optical signal.

The first optical ring resonator 161 and/or the second optical ring resonator 162 (FIG. 3A), may be included with the tunable optical phase shifters $\phi_{RF1}$ and $\phi_{RF2}$ in a much more space saving and power saving manner. One or both of the first bent optical waveguide arm 173 and the second bent optical waveguide arm 174 may also include the quasi-static optical phase shifter $\phi_{static2}$. The curved waveguide section in the first bent optical waveguide arm 173 and/or the second bent optical waveguide arm 174, typically the inner of the two arms, each may comprise an about 180° bend or a series of bends that result in an overall about 180° bend to reduce the distance between the first optical coupler 151 and the second optical coupler 152. Accordingly, a distance doc between the first optical coupler 151 and the second optical coupler 152, i.e. the minimum optical and physical length of the feedback optical waveguide 103 is dependent upon the bend radius of the first and second bent optical waveguide arms 173 and 174 and decoupled from the required length of the TW or lumped element control electrodes from the first and second tunable optical phase shifters $\phi_{RF1}$ and $\phi_{RF2}$, which may now extend perpendicular to the straight line doc extending between the first optical coupler 151 and the second optical coupler 152. One of the first bent optical waveguide arm 173 and the second bent optical waveguide arm 174 may include a meandering optical waveguide structure 175 to ensure the first bent optical waveguide arm 173 has substantially the same optical and/or physical length as the second bent optical waveguide arm 174.

Accordingly, the physical length of the feedback optical waveguide 103 may be shorter than the physical length of each of the first and second bent waveguide arms 173 and 174, and the optical length of the feedback optical waveguide 103 may be shorter than the optical length of each of the first and second bent waveguide arms 173 and 174, thereby enabling the physical and optical length of the feedback optical waveguide 103 to be reduced, which reduces the effect of the length of the MZI optical coupler 170, i.e. the coupling optical modulation element 102, on the overall physical and optical length of the optical loop 105, whereby higher electro-optic bandwidths (EOBWs) to be generated in a smaller footprint.

In conventional, standalone travelling-wave Mach Zehnder (TWMZ)-based modulators, there may be a trade-off between having a large EOBW and having longer electro-optic interaction length to improve phase efficiency and reduce the half-wave voltage (Vπ). A TWMZ with a short electro-optic interaction length will typically have a larger bandwidth, but reduced phase efficiencies and larger Vα. Conversely, a TWMZ with a longer electro-optic interaction length will have increased phase efficiencies and smaller Vπ, but typically will have a smaller bandwidth due to the increased RF losses and velocity mismatches between optical and RF modes in TWMZ. TWMZs are also quite long (on the order of millimeters) and occupy a large on-chip footprint.

Figure 3C:
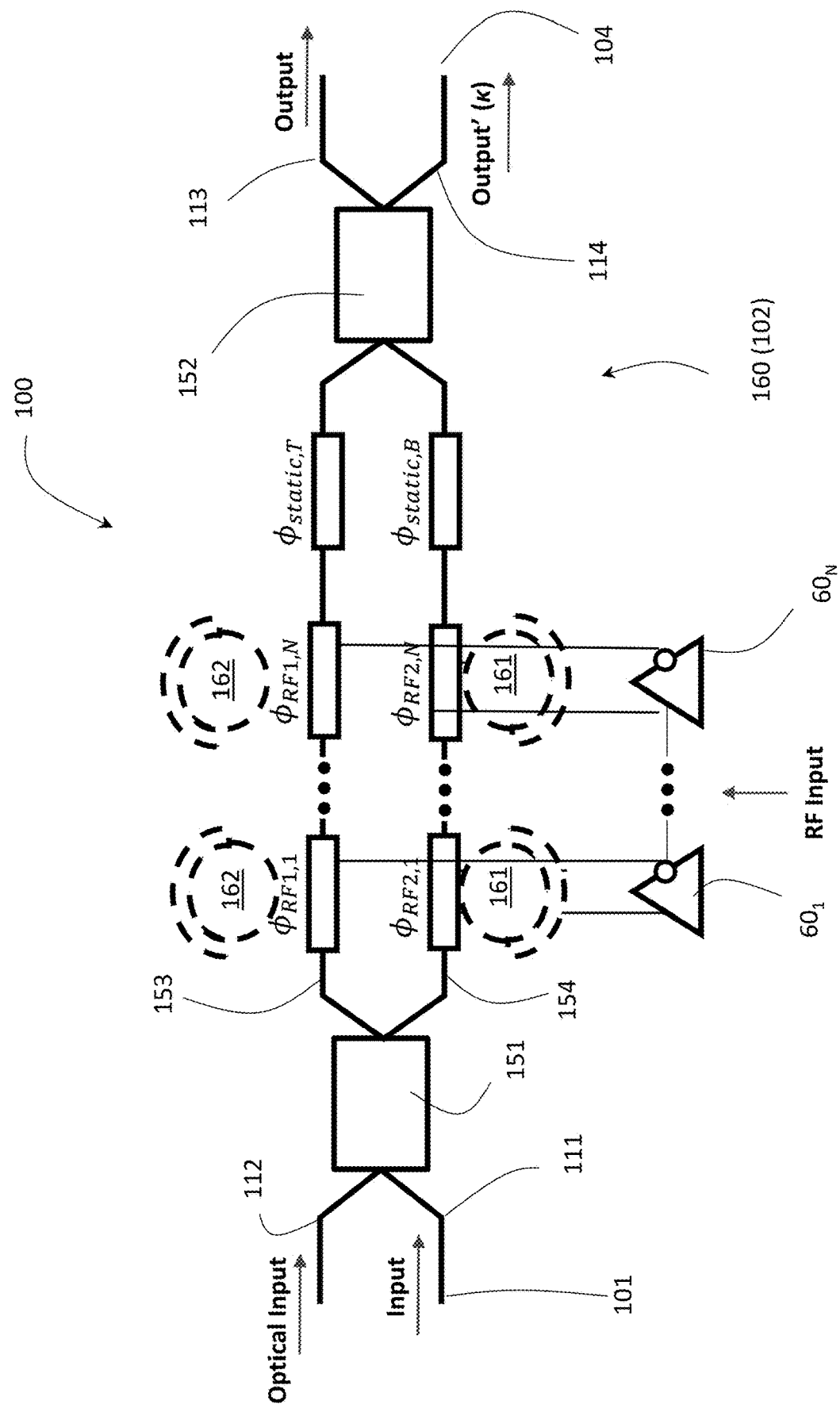
FIG. 3C is a schematic diagram of the coupling-modulated ring resonator optical modulator apparatus in accordance with the embodiment of FIG. 3A with segmented RF electrodes.
Figure 3D:
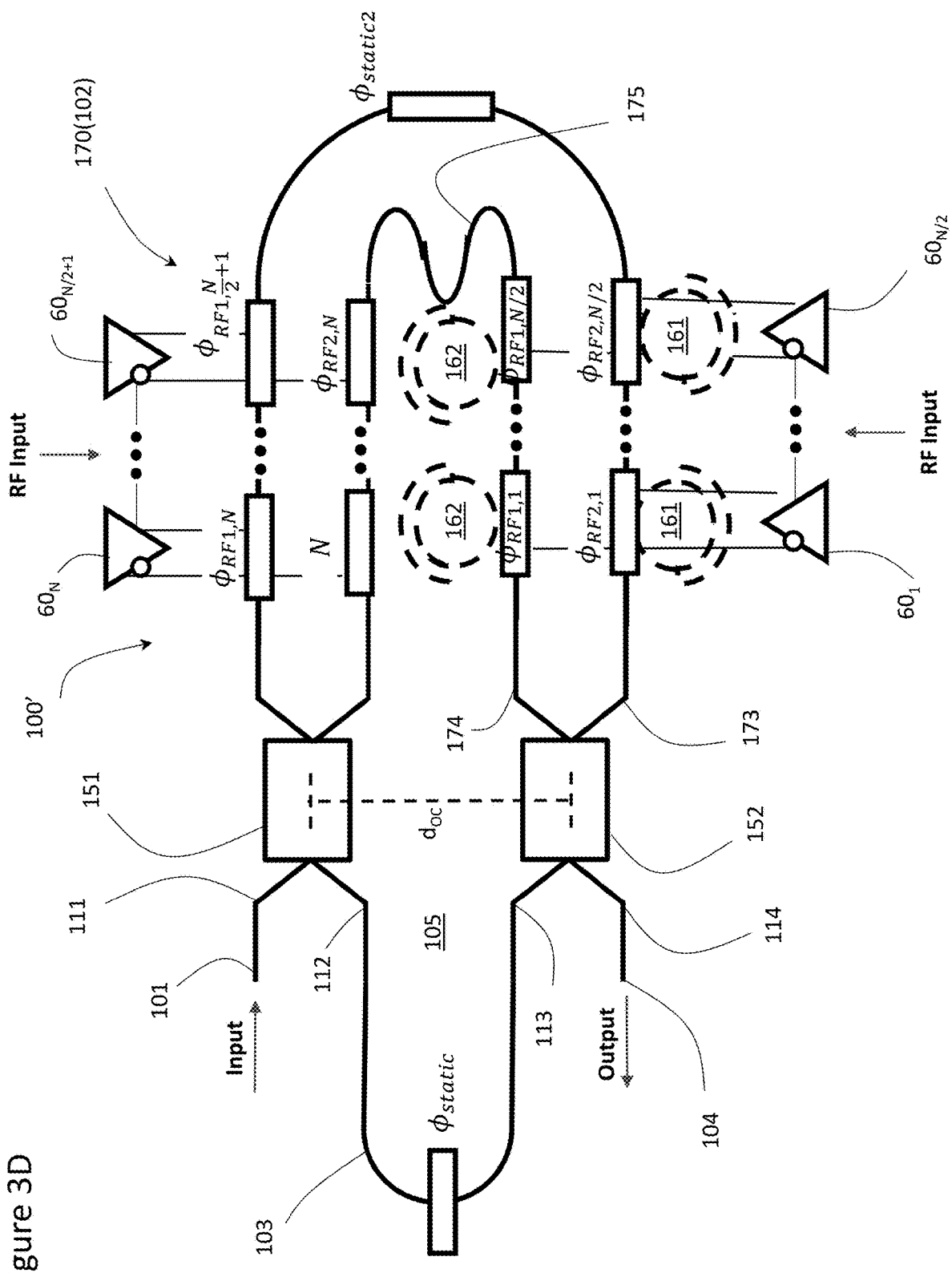
FIG. 3D is a schematic diagram of the coupling-modulated ring resonator optical modulator apparatus in accordance with the embodiment of FIG. 3A with bent arms and segmented RF electrodes.

With reference to FIGS. 3C and 3D, a solution to the bandwidth/drive-voltage tradeoff is to form each phase shifter $\phi_{RF1}$ and $\phi_{RF2}$ a series of RF electrode modulator segments $\phi_{RF1,1}$ to $\phi_{RF1,N}$ and $\phi_{RF2,1}$ to $\phi_{RF2,N}$ along and adjacent to the first and second waveguides 153 and 154 or 173 and 174 into the single MRR optical modulator apparatus 100 or 100', where each modulating RF electrode segment $\phi_{RF1,1}$ to $\phi_{RF1,N}$ and $\phi_{RF2,1}$ to $\phi_{RF2,N}$ is driven with a separate RF electronic driver output stage 60₁ to 60ₙ.

Multiple shorter modulating RF electrode segments $\phi_{RF1,1}$ to $\phi_{RF1,N}$ and $\phi_{RF2,1}$ to $\phi_{RF2,N}$ in an MZM, enable higher phase shifts which are proportional to the total length of the modulating RF electrode segments $\phi_{RF1,1}$ to $\phi_{RF1,N}$ and $\phi_{RF2,1}$ to $\phi_{RF2,N}$, while the bandwidth remains limited only to that of a single modulating segment. This type of MZM is referred to as a segmented MZM. A plurality of the first optical ring resonators 161 and/or the second optical ring resonators 162 optically coupled and adjacent to the first optical waveguide 153 and the second optical waveguide 154, respectively, may be included in each of the tunable optical phase shifters $\phi_{RF1}$ and $\phi_{RF2}$ with each of the modulating RF electrode segments $\phi_{RF1,1}$ to $\phi_{RF1,N}$ and $\phi_{RF2,1}$ to $\phi_{RF2,N}$ at least partially extending there around, in a much more space saving and power saving manner.

The electronic driver 60 may include an array of electrical outputs for outputting, in parallel, electrical radio frequency (RF) drive signals, one for each modulating RF electrode segments $\phi_{RF1,1}$ to $\phi_{RF1,N}$ and $\phi_{RF2,1}$ to $\phi_{RF2,N}$. Metallic RF transmission lines may electrically connected to the modulating RF electrode segments $\phi_{RF1,1}$ to $\phi_{RF1,N}$ and $\phi_{RF2,1}$ to $\phi_{RF2,N}$ to receive one of the electrical RF drive signals from a corresponding one of the array of electrical outputs of the electronic driver 60.

Because the optical cavities are designed to have high Q-factors, changing the drop-port coupling coefficient will result in a large change in the output power, and potentially phase based on bias conditions, of the device. For an MZM-based, drop-port coupling element, e.g. 102, 150, 160 or 170, changing the relative phase difference between the MZM arms, e.g. arms 153 and 154 or arms 173 and 174, alters the effective drop-port coupling coefficient, resulting in a change in output power/phase. To a first level approximation, for a fixed drive voltage, the output power swing of a Coupling Modulated Ring Resonator (CRR) optical modulator apparatus 100 or 100' is directionally proportional to the net-length of the active optical phase shifters $\phi_{RF1}$ and $\phi_{RF2}$ in the MZM arms, e.g. arms 153 and 154 or arms 173 and 174. Accordingly, by increasing the net length of the optical phase shifters $\phi_{RF1}$ and $\phi_{RF2}$, by either increasing the length of single modulating segment or with reference to FIGS. 3C and 3D, adding multiple modulating RF electrode segments $\phi_{RF1,1}$ to $\phi_{RF1,N}$ and $\phi_{RF2,1}$ to $\phi_{RF2,N}$, the output power can improved. The modulating RF electrode segments $\phi_{RF1,1}$ to $\phi_{RF1,N}$ and $\phi_{RF2,1}$ to $\phi_{RF2,N}$, may either be driven as a lumped element or as travelling-wave electrodes. The advantage of adding N-modulating RF electrode segments $\phi_{RF1,1}$ to $\phi_{RF1,N}$ and $\phi_{RF2,1}$ to $\phi_{RF2,N}$ is that multiple shorter modulating segments will result in higher overall EOBW as RF losses and velocity mismatch effects are less pronounced for short TWMZ modulating segments, i.e. less attenuation of the RF signal across the length of the TWMZ, and in the case of lumped element segments, only limited by the RC bandwidth. As a result, the overall bandwidth of the CMRR optical modulator apparatus 100 will effectively be equal to the bandwidth of a single modulating segment given that the propagation delays in the optical and electrical paths, e.g. from the driver 60, between modulating RF electrode segments $\phi_{RF1,1}$ to $\phi_{RF1,N}$ and $\phi_{RF2,1}$ to $\phi_{RF2,N}$ are properly designed and accounted for.

The high-speed phase shifter modulating RF electrode segments $\phi_{RF1,1}$ to $\phi_{RF1,N}$ and $\phi_{RF2,1}$ to $\phi_{RF2,N}$ may comprise or consist of one or more of: carrier-depletion mode phase shifters (reverse-biased PN junctions), carrier-injection mode phase shifters (forward-biased PN junctions), PIN diode phase shifters, lithium niobate phase shifters.

There are various methods and structures to drive/control the modulating RF electrode segments $\phi_{RF1,1}$ to $\phi_{RF1,N}$ and $\phi_{RF2,1}$ to $\phi_{RF2,N}$ of the segmented phase-shifters including but not limited to: multi-segment drivers with built-in delay; fixed delay interconnects between driver and PIC.; and some combination of the two listed above. One such method and structure is disclosed in U.S. patent application Ser. No. 17/561,071, filed Dec. 23, 2021 in the name of Basak et al, entitled: MULTI-SEGEMENT ELECTRO-OPTIC DEVICES WITH LOW LOSS RF DELAY LINES, which is incorporated herein by reference.

Various optical modulators of the present application may include structures and/or be operated by methods described in U.S. patent application Ser. No. 16/988,869, filed Aug. 10, 2020, by Meisam Bahadori et al. The US. patent application of this paragraph is incorporated herein, in its entirety.

The various Mach-Zehnder modulators (MZMs) of the present embodiments, e.g., the MZMs of FIGS. 3-10, may be driven, biased, and/or operated as described for the segmented MZMs of the following U.S. patents: U.S. Pat. No. 9,519,162, U.S. Ser. No. 10/168,596, U.S. Ser. No. 10/831,081 and/or U.S. Pat. No. 9,559,779. The MZMs of the present application, e.g., the MZMs in FIGS. 3-10, may include electronic drivers, control electrodes, drivers, and/or electrical driver and/or biasing connections as described in any of the same U.S. patents. The U.S. patents of this paragraph are incorporated herein, by reference, in their entirety.

Figure 4:
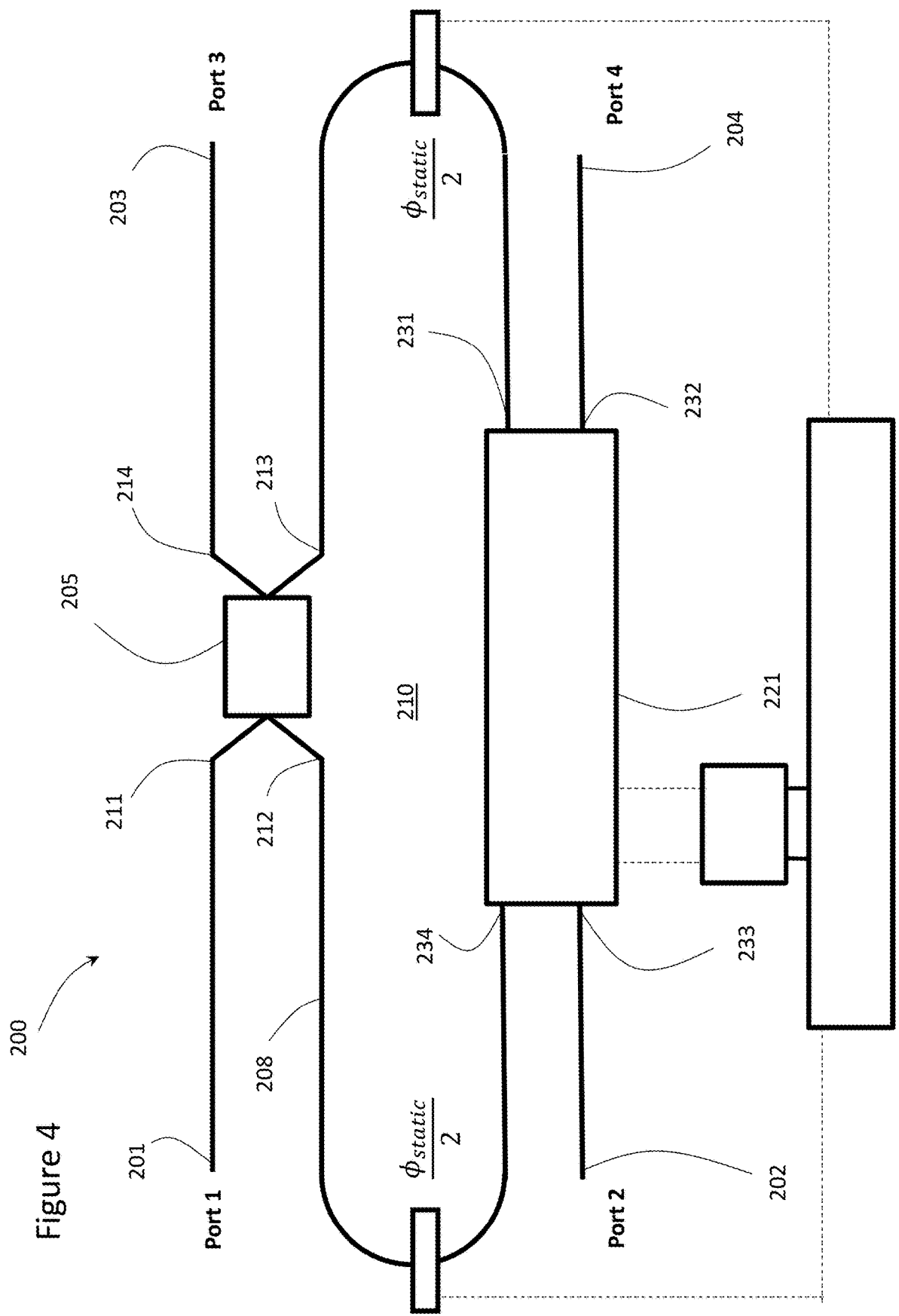
FIG. 4 is a schematic diagram of a coupling modulated (add-drop) micro-ring resonator optical modulator apparatus in accordance with an embodiment of the present invention.

FIG. 4 illustrates an alternate embodiment of a coupling modulated (add/drop) RR optical modulator apparatus 200, which may be used as an input coupling modulated RR optical modulator or an output coupling modulated RR optical modulator. The RR optical modulator apparatus 200 includes a first input/output optical port 201 (Port 1), a second input/output optical port 202 (Port 2), a third input/output optical port 203 (Port 3), a fourth optical input/output port 204 (Port 4), a input/output optical coupler 205, a feedback optical waveguide 208, and an input/output coupling optical modulation element 221, forming an optical, e.g. resonator, loop 210. The input/output coupling optical modulation element 221 may comprise any suitable element including any of the aforementioned optical coupling modulation elements, e.g. 102, 150, 160 or 170 in FIGS. 1-3. The input/output optical coupler 205 may include a first optical port 211 optically coupled to the input/output optical port 201, a second optical port 212, optically coupled to the feedback optical waveguide 208, a third optical port 213 optically coupled to the feedback optical waveguide 208, and a fourth optical port 214 optically coupled to the third input/output (through or drop) optical port 203. The input/output optical coupler 205 may comprise a single 2×2 directional optical coupler or a plurality of optical couplers providing any desired optical coupling coefficient/split ratio dependent upon the application. The input/output coupling optical modulation elements 221 may include a first optical input/output 231 optically coupled to the feedback optical waveguide 208, a second optical input/output 232 optically coupled to the fourth input/output (through or drop) optical port 204, a third optical input/output 233 optically coupled to the second input/output optical port 202, and a fourth optical input/output 234 optically coupled to the second optical port 212 of the input/output optical coupler 205 via the feedback optical waveguide 208.

For PAM applications, the coupling modulated RR optical modulator apparatus 200 may be operated as an input coupled coupling modulated RR optical modulator or an output coupled coupling modulated RR optical modulator. For an input coupled coupling optical modulated RR modulator, the second optical input/output port 202 (or the fourth input/output optical port 204) may be the input optical port (as in input optical port 101), while the first input/output optical port 201 (or the third input/output optical port 203) may be the output optical port (as in output optical port 104), and the fourth input/output optical port 204 (or the second input/output optical port 202) may be a drop port. Unused optical power or light may be expended via the drop port 203 (or 201) when not required in the output optical port 202 due to a conservation of power in the system.

Alternatively, for an output coupled coupling modulated MRR optical modulator apparatus 200, the first input/output optical port 201 (or the third input/output optical port 203) may be the input optical port (as in input optical port 101), while the second input/output optical port 202 (or the fourth input/output optical port 204) may be the output optical port (as in output optical port 104), and the third input/output optical port 203 (or the first input/output optical port 201) may be the drop optical port. Accordingly for PAM optical modulation, the optical modulator apparatus 200 may be configured such that any of the input/output optical ports 201-204 may be used as an input optical port and any of the other input/output optical ports 201-204 may be used an output optical port. In particular, if contra-directional coupling elements are used as the optical coupler 205 any combination of input and output ports may be possible.

For coherent applications, the coupling modulated RR optical modulator apparatus 200 is typically operated as an output coupled coupling modulated RR optical modulator, wherein the first input/output optical port 201 (or the third input/output optical port 203) may be the input optical port (as in input optical port 101), while the second input/output optical port 202 (or the fourth input/output optical port 204) may be the output optical port (as in output optical port 104), and the third input/output optical port 203 (or the first input/output optical port 201) may be the optical drop port.

With reference to FIG. 5A, the input/output coupling optical modulation element 221 may comprise a MZI optical coupler similar to MZI optical couplers 150, 160 or 170, including a first optical coupler 222 optically coupled to the first and second optical input/outputs 231 and 232, and a second optical coupler 223 optically coupled to the third and fourth optical input/outputs 233 and 234. A first waveguide arm 224 and a second waveguide arm 225 extend between input/outputs of the first optical coupler 222 and input/outputs of the second optical coupler 223. The first waveguide arm 224 may include the first tunable phase shifter $\phi_{RF1}$, and the second waveguide arm 225 may include the second tunable phase shifter $\phi_{RF2}$ and the quasi-static phase shifter $\phi_{static2}$. The first optical ring resonator 161 and/or the second optical ring resonator 162 (FIG. 6A) may be included to provide the tunable phase shifters $\phi_{RF1}$ and $\phi_{RF2}$ in a much more space and power saving manner.

The quasi-static phase shifter $\phi_{static}$ in the feedback optical waveguide 208 may be divided into two static phase shifter sections, each a fraction, e.g. $\phi_{static}/2$, of the overall total phase shift, one section at the input side of the input/output optical coupler 205 and one section at the output side of the input/output optical coupler 205 or may be a single phase shifter element $\phi_{static}$, as hereinbefore described.

Accordingly, the physical and optical length of the feedback optical waveguide 208 may be reduced, which reduces the effect of the length of the input/output coupler coupling optical modulation element 221 on the overall physical and optical length of the optical loop 210, whereby higher electro-optic bandwidths (EOBWs) to be generated in a smaller footprint.

Figure 5B:
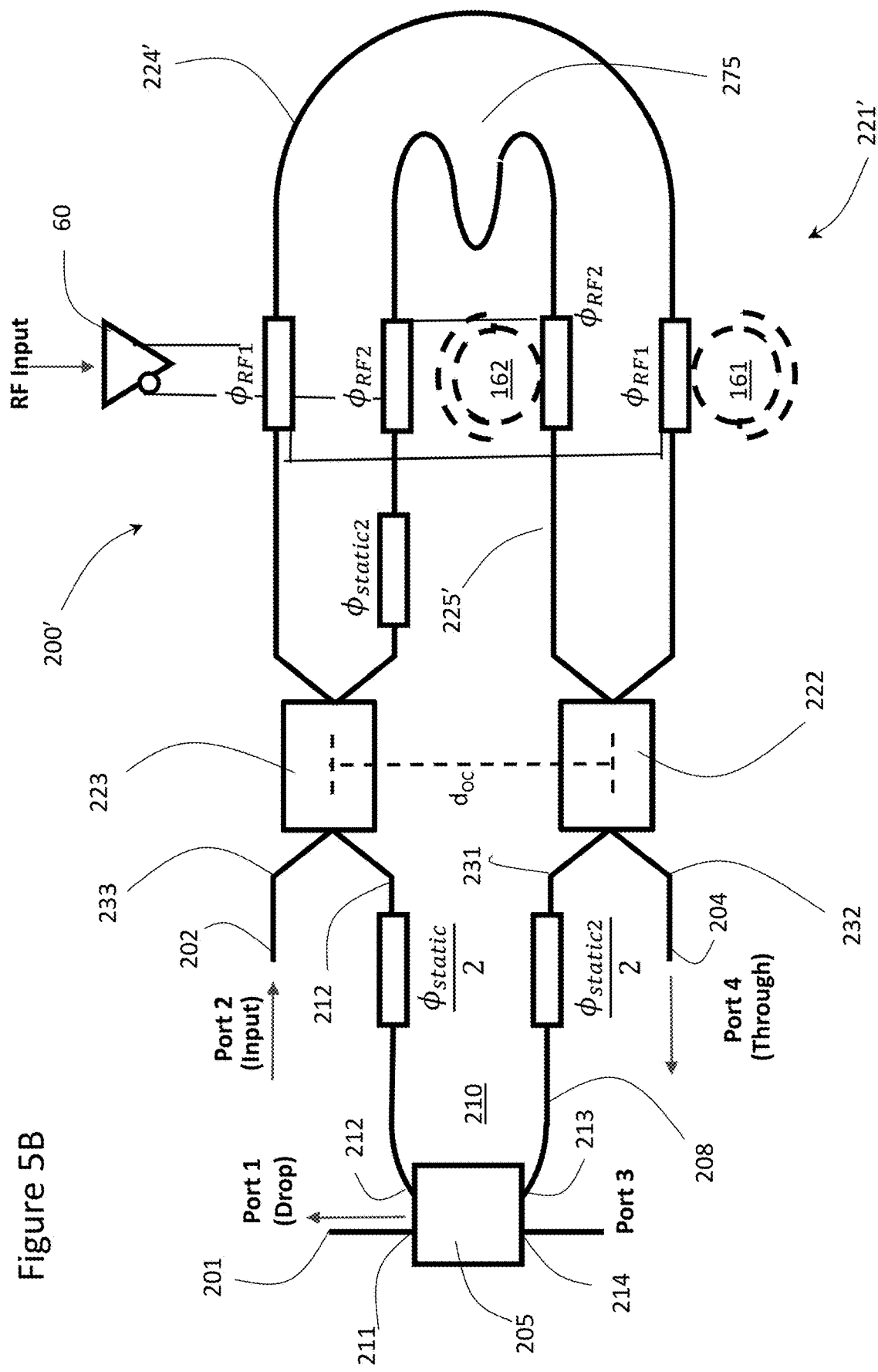
FIG. 5B is a schematic diagram of a coupling modulated (add-drop) ring resonator optical modulator apparatus in accordance with the embodiment of FIG. 5A with bent arms.

With reference to FIG. 5B, in an RR optical modulator apparatus 200', the input/output coupling optical modulation elements 221' may comprise the same elements as the MZI coupler coupling optical modulation element 221 in the RR optical modulator apparatus 200 of FIG. 5A, including the first optical coupler 222 optically coupled to the first and second optical input/outputs 231 and 232, and the second optical coupler 223 optically coupled to the third and fourth optical input/outputs 233 and 234. However, a first bent optical waveguide arm 224' and a second bent arm 225', similar to first and second bent optical waveguide arms 173 and 174, may extend between the optical input/outputs of the first optical coupler 222 and the optical input/outputs of the second optical coupler 223. The first bent optical waveguide arm 224 may include the first tunable phase shifter $\phi_{RF1}$ in or adjacent thereto, and the second bent optical waveguide arm 225 may include the second tunable phase shifter $\phi_{RF2}$ and the quasi-static phase shift $\phi_{static2}$ in or adjacent thereto.

The quasi-static phase shifter $\phi_{static}$ in the feedback optical waveguide 208 may be divided into two static phase shifter sections, each configured to provide a fraction, e.g. $\phi_{static}/2$, of the overall phase shift, one section at the input side of the input/output optical coupler 205 and one section at the output side of the input/output optical coupler 205 or may be a single phase shifter element $\phi_{static}$, as hereinbefore described. The first bent optical waveguide arm 224' may include the first tunable phase shifter $\phi_{RF1}$ in at least two phase shifter portions, each phase shifter portion in one of a pair of waveguide, e.g. parallel and straight, arm sections, and the second bent waveguide arm 225' may include the second tunable phase shifter $\phi_{RF2}$, in at least two phase shifter sections, each phase shifter section in one of a pair of waveguide, e.g. parallel and straight, arm sections, which may be differentially driven by the control 50 via the electronic driver 60 in a push-pull fashion by the first and second tunable phase shifters $\phi_{RF1}$ and $\phi_{RF2}$ for modulating the MZI coupler coupling optical modulation element 221', and therefore the output light. The first optical ring resonator 161 and the second optical ring resonator 162 (FIG. 3A) may be included to provide the tunable phase shifters $\phi_{RF1}$ and $\phi_{RF2}$ in a much more space and power saving manner. One of the first bent waveguide arm 224' and the second bent waveguide arm 225' may also include the quasi-static phase shift $\phi_{static2}$. The first bent waveguide arm 224' and the second bent waveguide arm 225' each may comprise a curved section between the waveguide arm sections comprising an about 180° bend or a series of bends that result in an overall about 180° bend to reduce the distance doc between the first optical coupler 222 and the second optical coupler 223. Accordingly, the straight-line distance doc between the first optical coupler 222 and the second optical coupler 223 is dependent upon the bend radius of the first and second bent waveguide arms 224' and 225' and decoupled from the required length of the TW or lumped element control electrodes on the first and second waveguide arms 224 and 225 as part of the first and second tunable phase shifters $\phi_{RF1}$ and $\phi_{RF2}$, which may now extend substantially perpendicular to the line representing the distance doc. One of the first bent waveguide arm 224' and the second bent waveguide arm 225' may include a meandering waveguide structure 275 to ensure the first bent waveguide arm 224' has substantially the same optical and/or physical length as the second bent waveguide arm 225'. Accordingly, the physical length of the feedback optical waveguide 208 may be shorter than the physical length of each of the first and second bent waveguide arms 224 and 225, and the optical length of the feedback optical waveguide 208' may be shorter than the optical length of each of the first and second bent waveguide arms 224 and 225, thereby enabling the physical and optical length of the feedback optical waveguide 208' to be reduced, which reduces the effect of the length of the MZI coupler coupling optical modulation element 221' on the overall physical and optical length of the optical loop 210', whereby higher electro-optic bandwidths (EOBWs) may be generated in a smaller footprint.

Figure 5C:
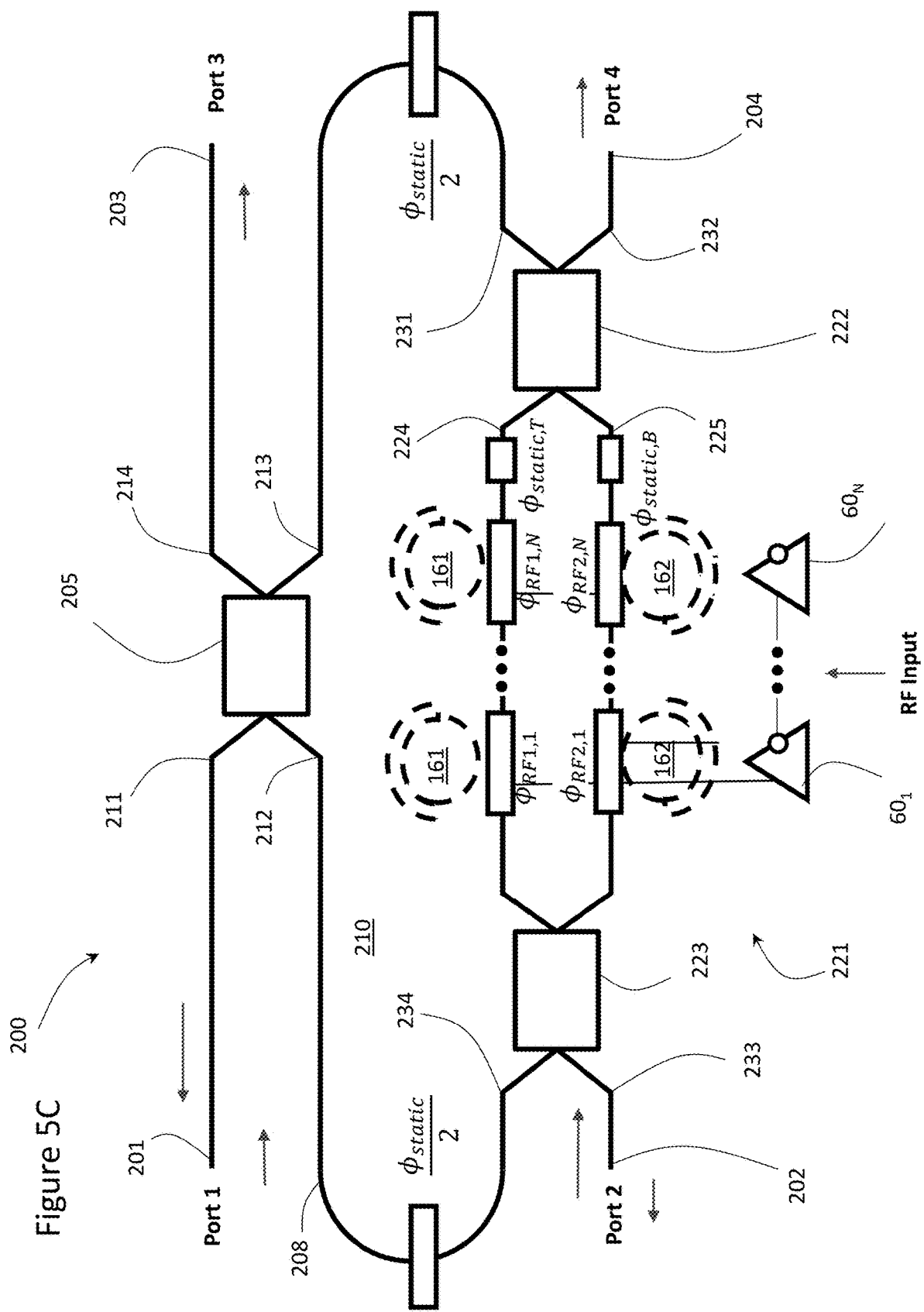
FIG. 5C is a schematic diagram of the coupling-modulated ring resonator optical modulator apparatus in accordance with the embodiment of FIG. 5A with segmented RF electrodes.
Figure 5D:
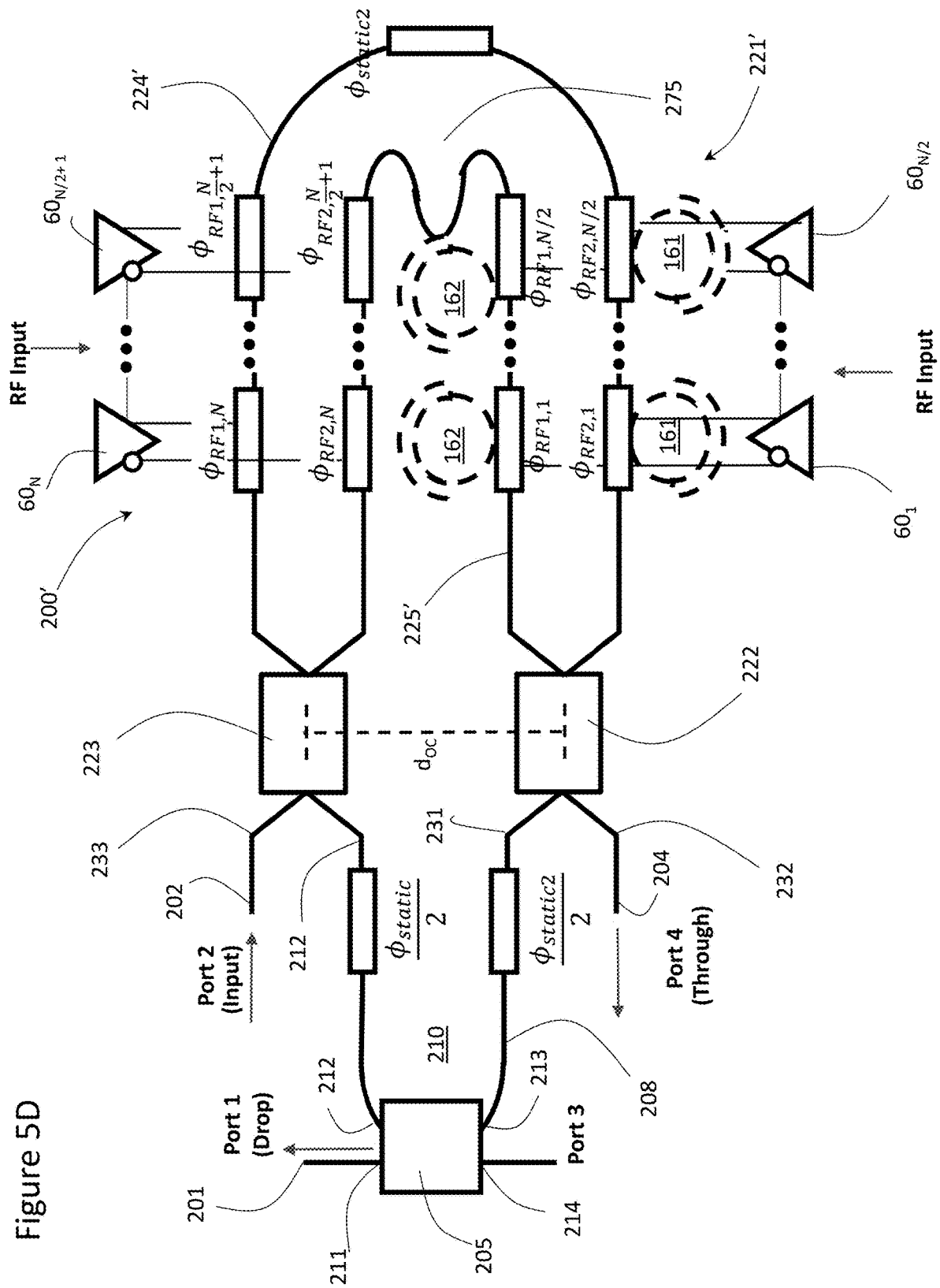
FIG. 5D is a schematic diagram of the coupling-modulated ring resonator optical modulator apparatus in accordance with the embodiment of FIG. 5A with bent arms and segmented RF electrodes.

With reference to FIGS. 5C and 5D, a solution to the aforementioned bandwidth/drive-voltage tradeoff is to form each optical phase shifter $\phi_{RF1}$ and $\phi_{RF2}$ into a plurality of modulating RF electrode segments $\phi RF_{1,1}$ to $\phi RF_{1,N}$ and $\phi RF_{2,1}$ to $\phi RF_{2,N}$ in each RR optical modulator apparatus 200 or 200', where each modulating RF electrode segment $RF_{1,1}$ to $\phi RF_{1,N}$ and $\phi RF_{2,1}$ to $\phi RF_{2,N}$ is driven with a separate RF driver output stage $60_1$ to $60_n$. Multiple shorter modulating RF electrode segments $\phi RF_{1,1}$ to $\phi RF_{1,N}$ and $\phi RF_{2,1}$ to $\phi RF_{2,N}$ in an MZM, enable higher phase shifts which are proportional to the total length of the modulating RF electrode segments $\phi RF_{1,1}$ to $\phi RF_{1,N}$ and $\phi RF_{2,1}$ to $\phi RF_{2,N}$, while the bandwidth remains limited only to that of a single modulating RF electrode segment. A plurality of the first optical ring resonators 161 and/or the second optical ring resonators 162 optically coupled and adjacent to the first optical waveguide 153 and the second optical waveguide 154, respectively, may be included in each of the tunable optical phase shifters $\phi_{RF1}$ and $\phi_{RF2}$ with each of the modulating RF electrode segments $\phi_{RF1,1}$ to $\phi_{RF1,N}$ and $\phi_{RF2,1}$ to $\phi_{RF2,N}$ at least partially extending there around, in a much more space saving and power saving manner.

The electronic driver 60 may include an array of electrical outputs for outputting, in parallel, electrical radio frequency (RF) drive signals, one for each modulating RF electrode segments $\phi_{RF1,1}$ to $\phi_{RF1,N}$ and $\phi_{RF2,1}$ to $\phi_{RF2,N}$. Metallic RF transmission lines may electrically connected to the modulating RF electrode segments $\phi_{RF1,1}$ to $\phi_{RF1,N}$ and $\phi_{RF2,1}$ to $\phi_{RF2,N}$ to receive one of the electrical RF drive signals from a corresponding one of the array of electrical outputs of the electronic driver 60.

Because the optical cavities are designed to have high Q-factors, changing the drop-port coupling coefficient will result in a large change in the output power, and potentially phase based on bias conditions, of the device. For an MZM-based, drop-port coupling element, e.g. 221, changing the relative phase difference between the MZM arms, e.g. arms 224 and 225, alters the effective drop-port coupling coefficient, resulting in a change in output power/phase. To a first level approximation, for a fixed drive voltage, the output power swing of a Coupling Modulated Ring Resonator (CRR) optical modulator apparatus 200 or 200' is directionally proportional to the net-length of the active optical phase shifters $\phi RF_1$ and $\phi RF_2$ in the MZM arms 224 and 225. Accordingly, by increasing the net length of the optical phase shifters $\phi RF_1$ and $\phi RF_2$, by either increasing the length of single modulating segment or with reference to FIGS. 5C and 5D, adding multiple modulating segments $\phi RF_{1,1}$ to $\phi RF_{1,N}$ and $\phi RF_{2,1}$ to $\phi RF_{2,N}$, the output power can improved. The modulating segments $\phi RF_{1,1}$ to $\phi RF_{1,N}$ and $\phi RF_{2,1}$ to $\phi RF_{2,N}$, may either be driven as a lumped element or as travelling-wave electrodes. The advantage of adding N-modulating segments $\phi RF_{1,1}$ to $\phi RF_{1,N}$ and $\phi RF_{2,1}$ to $\phi RF_{2,N}$ is that multiple shorter modulating segments will result in higher overall EOBW as RF losses and velocity mismatch effects are less pronounced for short TWMZ modulating segments, i.e. less attenuation of the RF signal across the length of the TWMZ, and in the case of lumped element segments, only limited by the RC bandwidth. As a result, the overall bandwidth of the CMRR optical modulator apparatus 200 or 200' will effectively be equal to the bandwidth of a single modulating segment given that the propagation delays in the optical and electrical paths, e.g. from the driver 60, between modulating segments $\phi RF_{1,1}$ to $\phi RF_{1,N}$ and $\phi RF_{2,1}$ to $\phi RF_{2,N}$ are properly designed and accounted for.

The high-speed phase shifter modulating segments $\phi RF_{1,1}$ to #$\phi RF_{1,N}$ and $\phi RF_{2,1}$ to $\phi RF_{2,N}$ may comprise or consist of one or more of: carrier-depletion mode phase shifters (reverse-biased PN junctions), carrier-injection mode phase shifters (forward-biased PN junctions), PIN diode phase shifters, lithium niobate phase shifters.

There are various methods to drive/control the modulating segments $\phi RF_{1,1}$ to $\phi RF_{1,N}$ and $\phi RF_{2,1}$ to $\phi RF_{2,N}$ of the segmented phase-shifters including but not limited to: multi-segment drivers with built-in delay; fixed delay interconnects between driver and PIC.; and some combination of the two listed above. One such method is disclosed in U.S. patent application Ser. No. 17/561,071, filed Dec. 23, 2021 in the name of Basak et al, entitled: MULTI-SEGEMENT ELECTRO-OPTIC DEVICES WITH LOW LOSS RF DELAY LINES, which is incorporated herein by reference.

Various optical modulators of the present application may include structures and/or be operated by methods described in U.S. patent application Ser. No. 16/988,869, filed Aug. 10, 2020, by Meisam Bahadori et al. The US. patent application of this paragraph is incorporated herein, in its entirety.

The various Mach-Zehnder modulators (MZMs) of the present embodiments, e.g., the MZMs of FIGS. 3-10, may be driven, biased, and/or operated as described for the segmented MZMs of the following U.S. patents: U.S. Pat. No. 9,519,162, U.S. Ser. No. 10/168,596, U.S. Ser. No. 10/831,081 and/or U.S. Pat. No. 9,559,779. The MZMs of the present application, e.g., the MZMs in FIGS. 3-10, may include electronic drivers, control electrodes, drivers, and/or electrical driver and/or biasing connections as described in any of the same U.S. patents. The U.S. patents of this paragraph are incorporated herein, by reference, in their entirety.

Figure 6:
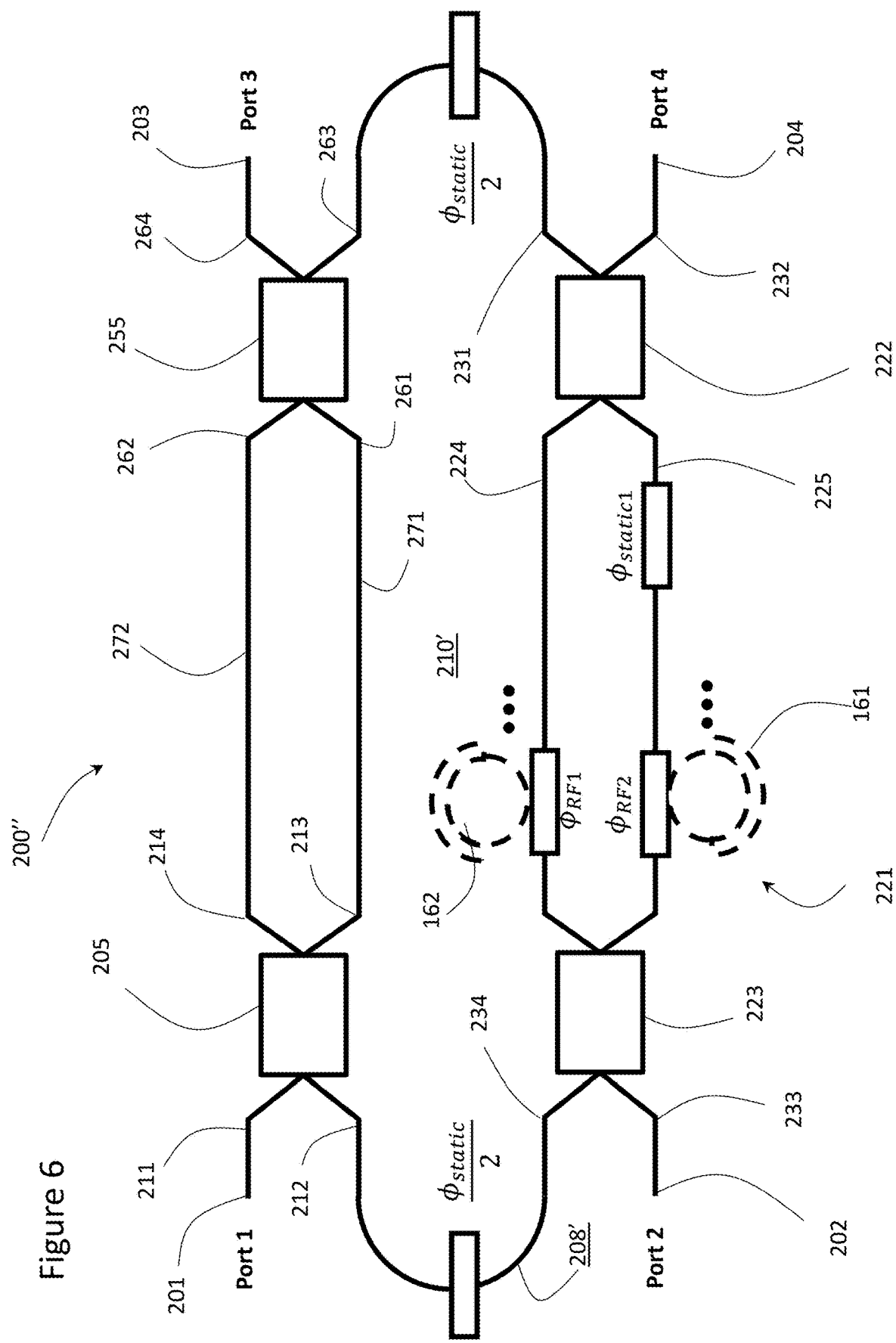
FIG. 6 is a schematic diagram of a coupling-modulated (add-drop) ring resonator optical modulator apparatus in accordance with an embodiment of the present invention.

FIG. 6 illustrates another embodiment of coupling modulated RR optical modulator apparatus 200", similar to FIG. 5A, in which the feedback optical waveguide 208' includes the input/output optical coupler 205, and an extra input/output optical coupler 255, e.g. a 2×2 directional optical coupler. The input/output optical coupler 205 includes the first optical port 211 optically coupled to the input optical port 201, and the second optical port 212 optically coupled to the feedback optical waveguide 208'. The third optical port 213 is optically coupled to a first optical port 261 of the extra input optical coupler 255, via a first waveguide arm 271, and the fourth optical port 214 is optically coupled to a second optical port 262 of the extra input optical coupler 255 via a second waveguide arm 272. A third optical port 263 is optically coupled to the first optical input/output 231 of the first optical coupler 222 via the feedback optical waveguide 208', and a fourth optical port 264 is optically coupled to the third input/output optical port 203. The quasi-static phase shifter $\phi_{static2}$ in the feedback optical waveguide 208' may be divided into two static phase shifter portions, e.g. each $\phi_{static2}/2$, one at the input or output side of the input/output optical coupler 205 and one at the output or input side of the extra input optical coupler 255. The first optical ring resonator 161 and the second optical ring resonator 162 (FIG. 3A) may be included to provide the tunable phase shifters $\phi_{RF1}$ and $\phi_{RF2}$ in a much more space and power saving manner. Each of the tunable optical phase shifters $\phi_{RF1}$ and $\phi_{RF2}$ may comprise a plurality of modulating RF electrode segments $\phi RF_{1,1}$ to $\phi RF_{1,N}$ and $\phi RF_{2,1}$ to $\phi RF_{2,N}$, as hereinbefore described.

Figure 7:
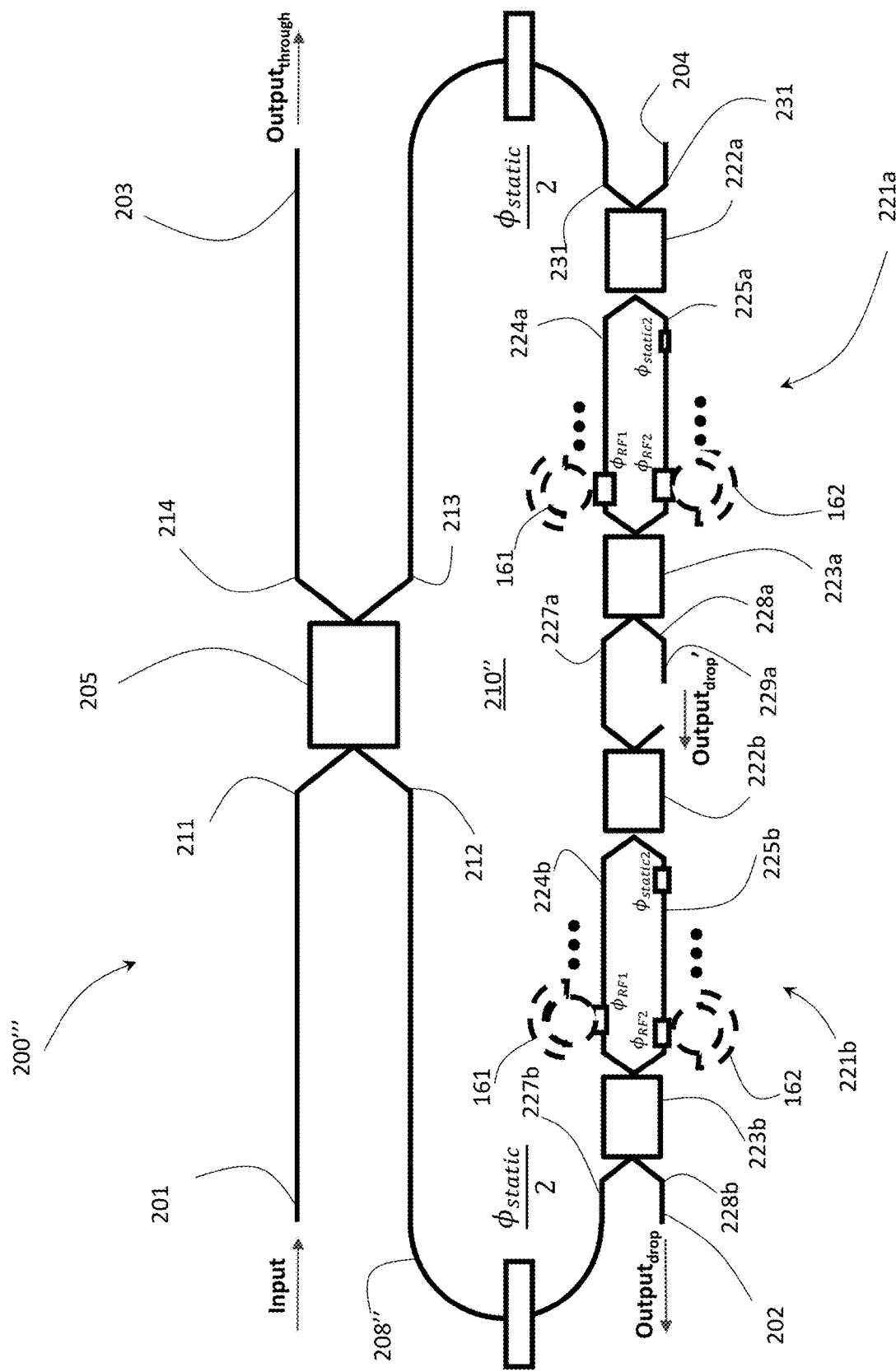
FIG. 7 is a schematic diagram of a coupling-modulated (add-drop) ring resonator optical modulator apparatus in accordance with an embodiment of the present invention.

FIG. 7 illustrates an alternate embodiment of a coupling modulated RR optical modulator apparatus 200''' including the first input/output optical port 201, the second input/output optical port 202, the third input/output optical port 203, the fourth input/output optical port 204, the input/output optical coupler 205, a feedback optical waveguide 208". The input/output optical coupler 205 may include the first optical port 211 optically coupled to the first input/output optical port 201, the second optical port 212, optically coupled to the feedback optical waveguide 208", the third optical port 213 optically coupled to the feedback optical waveguide 208", and the fourth optical port 214 optically coupled to the third input/output (through) optical port 203. The input/output optical coupler 205 may comprise a 2×2 directional optical coupler or an MZI-type optical coupler (similar to that in FIG. 6) for dividing the input beam of light into sub-beams or combining sub-beams into an output optical signal. The feedback optical waveguide 208" may include complementary MZI coupler optical modulation elements 221a and 221b. Each of the complementary MZI coupler optical modulation elements 221a and 221b may include an input optical coupler 222a and 222b, respectively, and an output optical coupler 223a and 223b, respectively, for separating the light in the feedback optical waveguide 208" into sub-beams and for combining the sub-beams back together. A first waveguide arm 224a and 224b and a second waveguide arm 225a and 225b extend between outputs of the input optical couplers 222a and 222b and inputs of the output optical couplers 223a and 223b, respectively. The first waveguide arms 224a and 224b include a tunable phase shifter $\phi_{RF1}$, and the second waveguide arms 225a and 225b include a tunable phase shifter $\phi_{RF2}$ and a quasi-static phase shifter $\phi_{static1}$. The first optical ring resonator 161 and the second optical ring resonator 162 (FIG. 3A) may be included in the first and second waveguide arms 224a, 224b and 225a, 225b, respectively, to provide the tunable phase shifters $\phi_{RF1}$ and $\phi_{RF2}$, respectively, in a much more space and power saving manner. Each of the tunable optical phase shifters $\phi_{RF1}$ and $\phi_{RF2}$ may comprise a plurality of modulating RF electrode segments $\phi RF_{1,1}$ to $\phi RF_{1,N}$ and $\phi RF_{2,1}$ to $\phi RF_{2,N}$, as hereinbefore described.

A first optical output 227a of the output optical coupler 223a is optically coupled to an optical input of the second input optical coupler 222b, while a second optical output 228a is optically coupled to a first optical drop port 229a. A first optical output 227b of the optical output coupler 223b is optically coupled to the second optical port 212 of the input/output optical coupler 205 via the feedback optical waveguide 208", while a second optical output 228b is optically coupled to the second optical port 202, which may act as a second optical drop port 229b.

The additional, i.e. complementary, coupling optical modulation element 221a, enables light, e.g. optical power, to be expended out of one of the second optical outputs 228a or 228b, whenever the light is not required in the other second optical output 228b or 228a, ensuring a consistent amount of light, i.e. optical power, in the waveguide loop 210" at all times.

The quasi-static phase shifter $\phi_{static2}$ in the feedback optical waveguide 208" may be divided into two quasi-static phase shifter portions, e.g. each $\phi_{static2}/2$, one at the input side of the input/output optical coupler 205 and one at the output side of the input/output optical coupler 205 or combined into a single one.

The MZI coupler optical modulation elements 221, 221a and 221b illustrated in FIGS. 6 and 7, may be replaced by any suitable coupling modulation element, including any of the aforementioned coupling modulation elements, e.g. 102, 150, 160 or 170.

Figure 8:
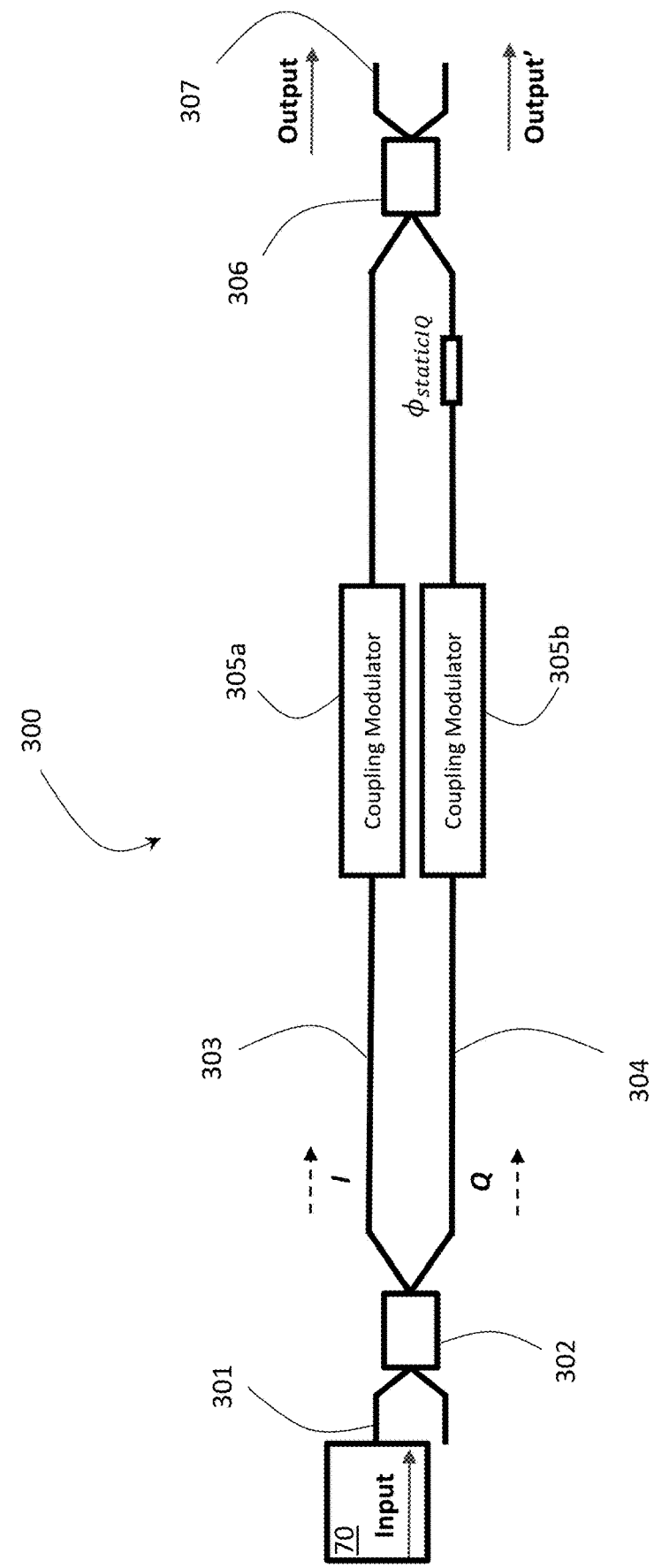
FIG. 8 is a schematic diagram of an IQ modulator utilizing the coupling-modulated ring resonator optical modulator apparatus in accordance with an embodiment of the present invention.
Figure 9:
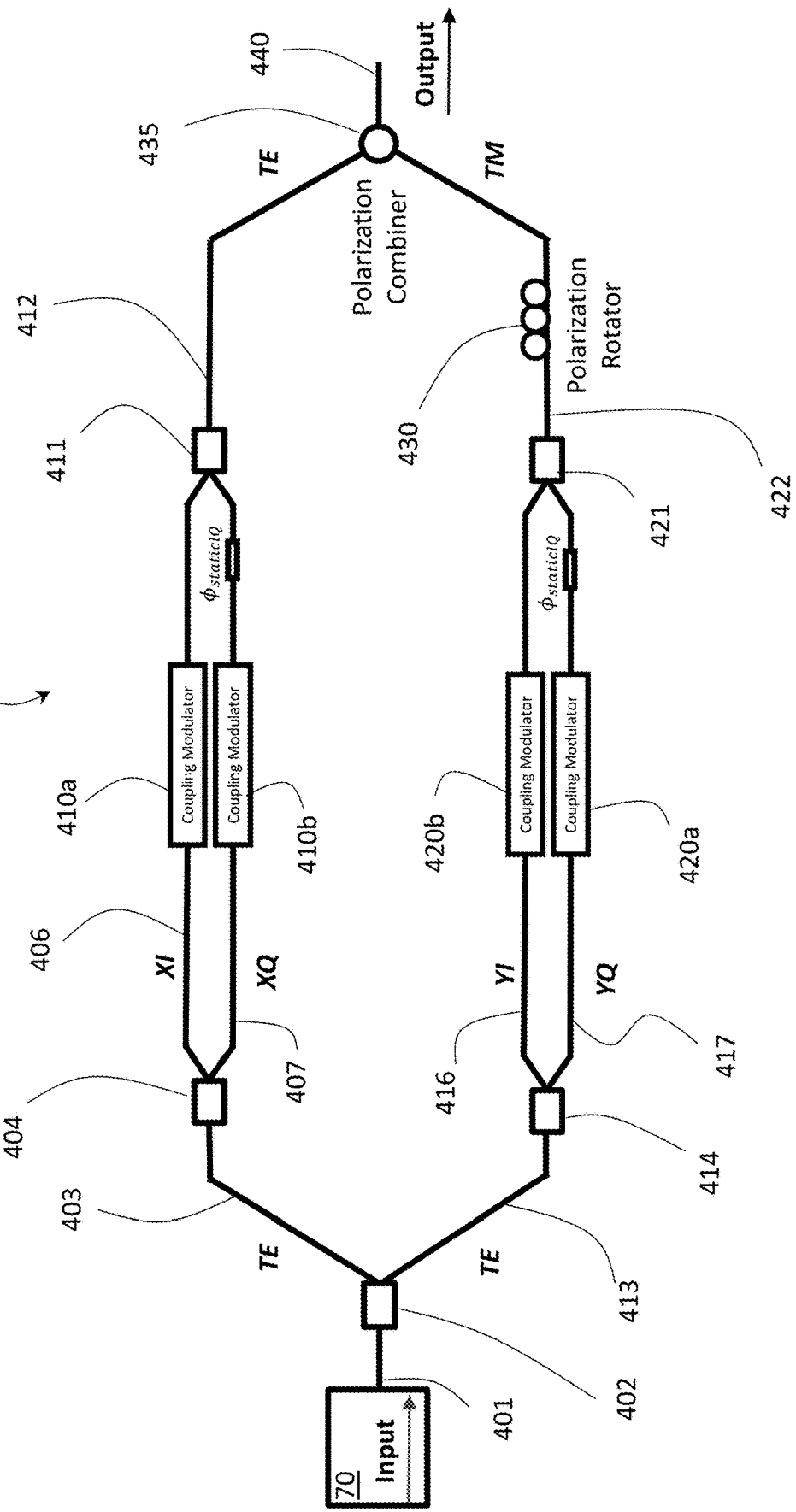
FIG. 9 is a schematic diagram of an DP IQ modulator utilizing the coupling-modulated, optical modulator apparatus in accordance with an embodiment of the present invention.

FIGS. 1 to 7 illustrate coupling modulated RR optical modulators, which are suited for PSK applications due to their simple optical phase biasing schemes that produce binary phase shift keyed outputs. As a result, these optical modulators may be configured to create nested IQ optical modulators, or a nested dual polarization (DP) IQ optical modulators for coherent applications, as shown in FIG. 8 and FIG. 9, respectively. In FIG. 8, the complementary driven coupling optical modulation elements 221a and 221b may be used to maintain a constant intracavity optical field amplitude.

An IQ modulator 300 illustrated in FIG. 8, includes an input optical port 301 for receiving an input continuous wave light signal from a light source, e.g. laser. An input optical coupler 302, optically coupled to the input optical port 301, splits the input light signal into two optical sub-beams, i.e. an I beam and a Q beam. The input optical coupler 302 may be omitted if two input optical beams are provided by separate sources. The I beam is directed along a first optical waveguide arm 303 to a first coupling modulated RR optical modulator 305a, e.g. coupling modulated RR optical modulator apparatus 100, 100', 200, 200', 200'' or 200''', and the Q beam is directed along a second optical waveguide arm 304 to a second coupling modulated RR optical modulator 305b identical to the first coupling modulated RR optical modulator 305a, e.g. coupling modulated RR optical modulator apparatus 100, 100', 200, 200', 200'' or 200'''. One of the first and second optical waveguide arms 303 and 304 may include a quasi-phase shifter $\phi\phi_{staticIQ}$ to instill a phase shift, e.g. $\pi/2$, between the modulated I beam and the modulated Q beam. An output optical coupler 306 combines the modulated I beam and the modulated Q beam for output an output optical port 307.

Similarly, a DP IQ modulator apparatus 400 illustrated in FIG. 9, includes an input optical port 401 for receiving an input continuous wave light signal from a light source, e.g. laser. An input optical coupler 402, optically coupled to the input optical port 401, splits the input light signal into two optical sub-beams, i.e. an X beam and a Y beam. The input optical coupler 402 may be omitted if two input optical beams are provided by separate sources. The X beam is directed along an X optical waveguide 403 to an X optical splitter 404, which further splits the X beam into an XI beam and a XQ beam. The XI beam is directed along a first optical waveguide arm 406 to a first coupling modulated RR optical modulator 410a, e.g. coupling modulated MRR optical modulator apparatus 100, 100', 200, 200', 200'' or 200''', and the XQ beam is directed along a second optical waveguide arm 407 to a second coupling modulated RR optical modulator 410b, e.g. coupling modulated RR optical modulator apparatus 100. 100', 200, 200', 200'' or 200'''. One of the first and second optical waveguide arms 406 and 407 may include a quasi-static phase shifter $\phi_{staticIQ}$ to instill a phase shift, e.g. $\pi/2$, between the modulated XI beam and the modulated XQ beam. An output optical coupler 411 combines the modulated XI beam and the modulated XQ beam for output an X output optical port 412.

Similarly, the Y beam is directed along an Y optical waveguide 413 to a Y optical splitter 414, which further splits the Y beam into an YI beam and a YQ beam. The input optical coupler 402, the X optical splitter 404 and the Y optical splitter 414 may be omitted if four input optical beams are provided by separate sources. The YI beam is directed along a first optical waveguide arm 416 to a first coupling modulated MRR optical modulator 420a, e.g. coupling modulated RR optical modulator apparatus 100, 100', 200, 200', 200'' or 200''', and the YQ beam is directed along a second optical waveguide arm 417 to a second coupling modulated RR optical modulator 420b, e.g. coupling modulated RR optical modulator apparatus 100, 100', 200, 200', 200'' or 200'''. One of the first and second optical waveguide arms 416 and 417 includes a quasi-phase shifter $\phi\phi_{staticIQ}$ to instill a phase shift, e.g. $\pi$ or $\pi/2$, between the modulated YI beam and the modulated YQ beam, An output optical coupler 421 combines the modulated YI beam and the modulated YQ beam for output an Y output optical port 422.

One of the X output optical port 412 and Y output optical port 422 is optically coupled to a polarization rotator 430 for rotating a polarization of the combined YI/YQ beam or the combined XI/XQ beam to a polarization state orthogonal to the other, as all the sub-beams YI, YQ, XI and XQ initially had the same polarization state. A polarization combiner 435, optically coupled to the X output optical port 412 and the Y output optical port 422 combines the combined YI/YQ beam and the combined XI/XQ beam for output an output optical port 440.

Figure 10A:
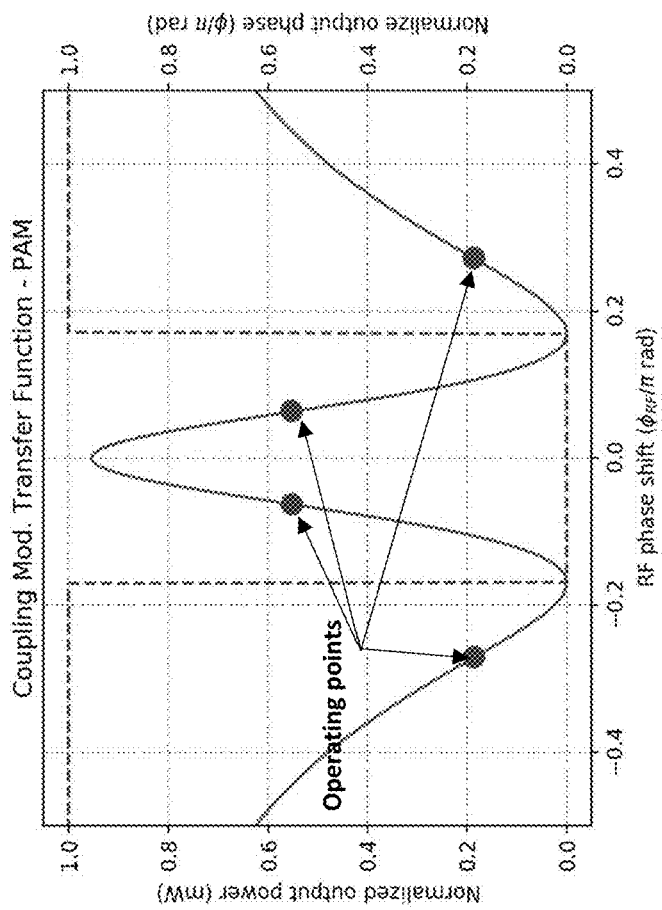
FIG. 10A is a plot of the symbol transitions for a intracavity modulated ring resonator and for a coupling-modulated, ring resonator optical modulator for PAM applications.
Figure 10B:
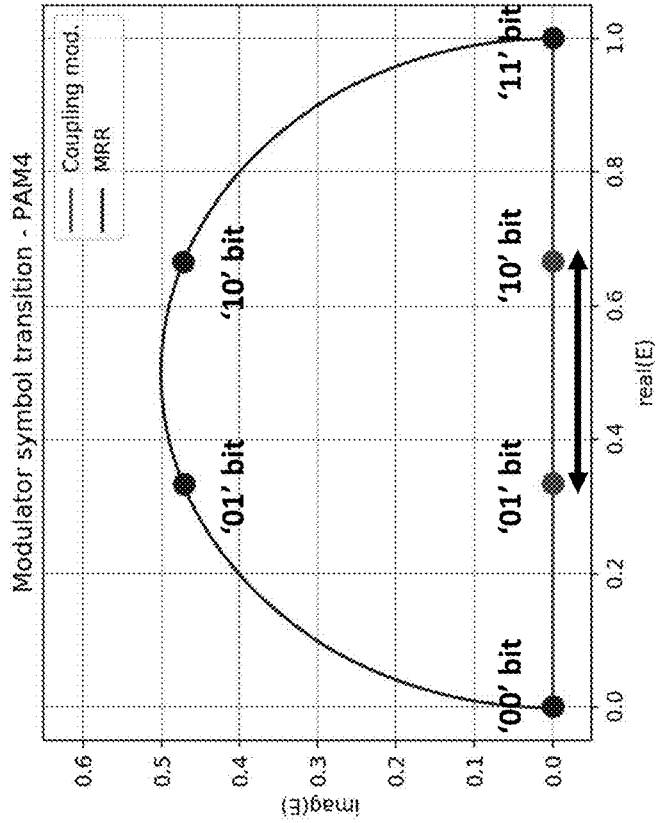
FIG. 10B is the transfer function for the coupling-modulated, ring resonator optical modulator of FIG. 1-3 (configured for PAM)
Figure 11A:
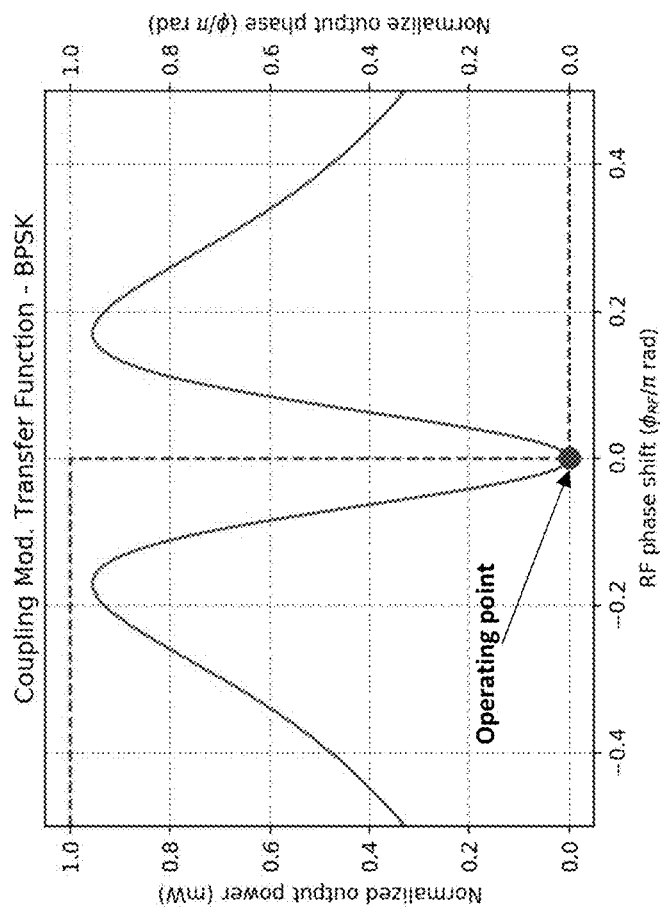
FIG. 11A is a plot of the symbol transitions for an intracavity-modulated ring resonator optical modulator and for a coupling modulated micro-ring modulator for BPSK applications.

To describe the difference in operating principles between intracavity modulated and coupling modulated RR optical modulators, a plot of the symbol transitions for the two modulator types is illustrated in FIG. 10A for PAM4 and FIG. 11A for BPSK. For PAM4, in FIG. 10A, in the complex domain, the symbol transition between the bits for coupling modulation is linear, as the real part of the optical field varies, but the imaginary part is constant, and hence, phase of the field is constant. This is in contrast to the response of the intracavity optical modulator, where both the real and imaginary part of the optical field varies, and as a result, a linear transition between symbols cannot be achieved. In FIG. 10B, a plot of the transfer function of a coupling optical modulator (FIG. 2) is shown. There are clearly four operating points where the transfer function is linear and the phase is constant, thus suitable to PAM4 transmissions. The quasi-static phase shifter #static may be used to set the normal bias position, e.g. about half way in between the minimum and maximum output power positions, and the first tunable phase shifter $\phi_{RF1}$ and/or the second tunable phase shifter $\phi_{RF2}$ may be normally or differentially driven by the electronic driver 60 to shift the total bias between minimum and maximum output positions. In the illustrated example, an RF phase shift by the coupling modulation element 102, e.g. the MZI optical coupler 150 or 170) of less than +/−0.2π radians, e.g. about +/−0.18π radians, provides a complete transmission swing, e.g. from 0% to 100% transmission.

Figure 11B:
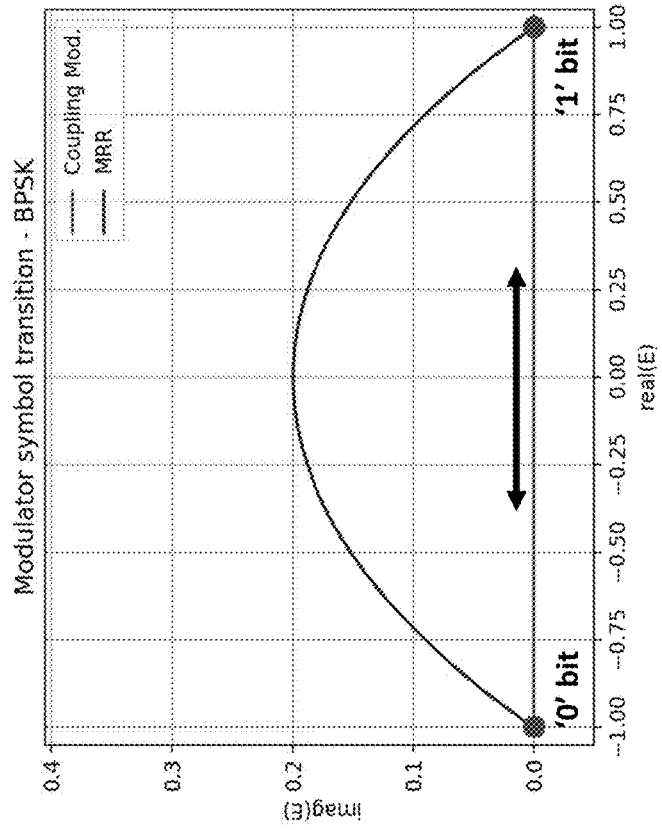
FIG. 11B is the transfer function for the coupling-modulated ring resonator optical modulator of FIG. 4-5 (configured for BPSK).

For BPSK, in FIG. 11A, in the complex domain, the symbol transition between bits for coupling optical modulation is again linear, as the real part of the optical field varies, but the absolute value of the imaginary part is constant, but flips sign when crossing the imaginary axis. This is in contrast to the response of the intracavity modulator, where both the real and imaginary parts of the optical field vary between transitions, and as a result, a linear transition between symbols cannot be achieved. In FIG. 11B, a plot of the transfer function of a coupling optical modulator 100 configured for PSK (FIG. 5A or 5B), is shown, where the first input/output optical port 201 (Port 1) is the input optical port and the second input/output optical port 202 (Port 2) is the output optical port. There is a single operating point, where the optical modulator apparatus 200 is biased at null. On either side of this operating point, the amplitude of the output signal is the same but with complementary optical phase, i.e. the optical modulator apparatus 200 may be configured for coherent applications. In the illustrated example, an RF phase shift by the coupling optical modulation element 221 of less than +/−0.2π radians, e.g. about +/−0.18π radians, provides a complete transmission swing, e.g. from 0% to 100% transmission.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An apparatus comprising:
    a Mach-Zehnder optical modulator including a first optical coupler, a second optical coupler, a first optical waveguide, and a second optical waveguide, each of the first optical waveguide and the second optical waveguide connecting a corresponding optical output of the first optical coupler to a corresponding optical input of the second optical coupler;
    an optical feedback waveguide connecting an optical output of the second optical coupler to an optical input of the first optical coupler;
    a first optical phase shifter along one of the first optical waveguide and the second optical waveguide, the first optical phase shifter comprising a first plurality of electrode segments; and
    an electronic driver including a plurality of electronic driver stages, each of the plurality of electronic driver stages configured to operate a corresponding one of the first plurality of electrode segments in parallel;
    wherein the first optical waveguide comprises a first bent optical waveguide arm and the second optical waveguide comprises a second bent optical waveguide arm; and
    wherein the first bent optical waveguide arm includes a first straight optical waveguide section and a second straight optical waveguide section, the first straight optical waveguide section and the second straight optical waveguide sections being substantially parallel and optically connected by a bent optical waveguide section.

2. The apparatus according to claim 1, wherein a physical length of the optical feedback waveguide is shorter than a physical length of each of the first optical waveguide and the second optical waveguide.

3. The apparatus of claim 1, further comprising a plurality of RF waveguides electrically connecting the electronic driver to the first plurality of electrode segments, the plurality of RF waveguides having a plurality of electrical connections configured to drive the first plurality of electrode segments.

4. The apparatus according to claim 1, wherein the first bent optical waveguide arm includes an about 180° bend between the first straight optical waveguide section and the second straight optical waveguide section.

5. The apparatus according to claim 1, wherein at least one of the first plurality of electrode segments extends along the first straight optical waveguide section, and at least one of the first plurality of electrode segments extends along the second straight optical waveguide section.

6. The apparatus according to claim 1, wherein the first optical phase shifter comprises a plurality of optical ring resonators optically connected to the first optical waveguide, each of the plurality of optical ring resonators having one of the first plurality of electrode segments extending at least partially there along.

7. The apparatus according to claim 1, further comprising:
    a second optical phase shifter adjacent the second optical waveguide, the second optical phase shifter comprising a second plurality of electrode segments; and
    wherein the electronic driver is configured to drive the first optical phase shifter and the second optical phase shifter in a push-pull configuration.

8. An apparatus comprising:
    a Mach-Zehnder optical modulator including a first optical coupler, a second optical coupler, a first optical waveguide, and a second optical waveguide, each of the first optical waveguide and the second optical waveguide connecting a corresponding optical output of the first optical coupler to a corresponding optical input of the second optical coupler;
    an optical feedback waveguide connecting an optical output of the second optical coupler to an optical input of the first optical coupler;
        a third optical coupler having more than two optical ports, a first segment of the optical feedback waveguide being optically connected to a second segment of the optical feedback waveguide by the third optical coupler;
    a first optical phase shifter adjacent to at least one of the first optical waveguide or the second optical waveguide; the first phase shifter comprising a first plurality of electrode segments; and
    an electronic driver including a plurality of electronic driver stages, each of the plurality of electronic driver stages configured to operate a corresponding one of the first plurality of electrode segments in parallel;
    wherein the first optical waveguide comprises a first bent optical waveguide arm and the second optical waveguide comprises a second bent optical waveguide arm; and
    wherein the first bent optical waveguide arm includes a first straight optical waveguide section and a second straight optical waveguide section, the first straight optical waveguide section and the second straight optical waveguide sections being substantially parallel and optically connected by a bent optical waveguide section.

9. The apparatus of claim 8, further comprising a plurality of RF waveguides electrically connecting the electronic driver to the first plurality of electrode segments, the plurality of RF waveguides having a plurality of electrical connections configured to drive the first plurality of electrode segments.

10. The apparatus of claim 8, wherein the third optical coupler comprises a Mach-Zehnder interferometer.

11. The apparatus according to claim 1, further comprising:
    a second optical modulator, connected in parallel with the first optical modulator;
    a first optical combiner for combining a first modulated output signal from the first optical modulator and a second modulated output signal from the second optical modulator; and an first additional phase shifter between the second optical modulator and the first combiner to provide a first phase shift between the first modulated output signal and the second modulated output signal.

12. The apparatus according to claim 11, further comprising:
a third optical modulator and a fourth optical modulator connected in parallel with the first optical modulator and the second optical modulator for outputting a third modulated output signal and a fourth modulated output signal, respectively;
a second combiner for combining the third modulated output signal and the fourth modulated output signal;
a second additional phase shifter between the fourth optical modulator and the second combiner to provide a second phase shift between the third modulated output signal and the fourth modulated output signal;
a polarization rotator for rotating the polarization of the third modulated output signal and the fourth modulated output signal; and
a polarization combiner for combining the first modulated output signal, the second modulated output signal, the third modulated output signal, and the fourth modulated output signal.

13. The apparatus of claim 8, wherein the first optical phase shifter comprises a first plurality of optical ring resonators optically connected to and adjacent to the first optical waveguide.

14. The apparatus according to claim 13, further comprising a second optical phase shifter adjacent to the second optical waveguide; wherein the second optical phase shifter comprises a second plurality of optical ring resonators optically connected to and adjacent to the second optical waveguide.

15. The apparatus of claim 8, further comprising:
a second optical phase shifter adjacent the second optical waveguide; and
wherein the electronic driver is configured to operate the first optical phase shifter and the second optical phase shifter in a push-pull configuration.

16. The apparatus according to claim 8, wherein the second optical waveguide comprises a second bent optical waveguide arm; and
wherein the second bent optical waveguide arm includes first and second straight optical waveguide sections, the first and second straight optical waveguide sections being substantially parallel and optically connected by a bent optical waveguide section.

17. The apparatus according to claim 16, wherein the first bent optical waveguide arm includes an about 180° bend between the first straight optical waveguide section and the second straight optical waveguide section.

18. The apparatus according to claim 7, further comprising:
a second optical modulator optically connected in parallel with the first optical modulator configured to form a nested optical modulator.

19. The apparatus according to claim 18, further comprising:
a third optical modulator and a fourth optical modulator, connected in parallel with the nested optical modulator;
a polarization combiner for combining a first modulated optical signal, a second modulated optical signal from the nested optical modulator with a third modulated optical signal, and a fourth modulated optical signal from the third optical modulator and the fourth optical modulator, respectively.

20. The apparatus of claim 7, wherein a physical length of the optical feedback waveguide is shorter than a physical length of each of the first optical waveguide and the second optical waveguide.

* * * * *